(12) United States Patent
Elko et al.

(10) Patent No.: US 8,788,719 B2
(45) Date of Patent: Jul. 22, 2014

(54) EXECUTING A START OPERATOR MESSAGE COMMAND

(71) Applicant: International Business Machines Corporation, Armonk, NY (US)

(72) Inventors: David A. Elko, Austin, TX (US); Steven N. Goss, Poughkeepsie, NY (US); Thomas C. Shaw, Marlboro, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 13/681,604

(22) Filed: Nov. 20, 2012

(65) Prior Publication Data

US 2013/0081058 A1 Mar. 28, 2013

Related U.S. Application Data

(63) Continuation of application No. 13/157,910, filed on Jun. 10, 2011.

(51) Int. Cl.
*G06F 3/00* (2006.01)
*G06F 13/00* (2006.01)

(52) U.S. Cl.
USPC ............ 710/5; 710/2; 710/8; 710/11; 710/15

(58) Field of Classification Search
None
See application file for complete search history.

(56) References Cited

U.S. PATENT DOCUMENTS

| | | | |
|---|---|---|---|
| 5,317,739 A | 5/1994 | Elko et al. | |
| 5,388,266 A | 2/1995 | Frey et al. | |
| 5,394,542 A | 2/1995 | Frey et al. | |
| 5,551,013 A | 8/1996 | Beausoleil et al. | |
| 5,561,809 A | 10/1996 | Elko et al. | |
| 5,574,873 A | 11/1996 | Davidian | |
| 5,574,945 A | 11/1996 | Elko et al. | |
| 5,630,050 A | 5/1997 | Neuhard et al. | |
| 5,790,825 A | 8/1998 | Traut | |
| 6,009,261 A | 12/1999 | Scalzi et al. | |
| 6,199,179 B1 | 3/2001 | Kauffman et al. | |
| 6,205,501 B1 | 3/2001 | Brief et al. | |
| 6,308,255 B1 | 10/2001 | Gorishek, IV et al. | |

(Continued)

FOREIGN PATENT DOCUMENTS

| CN | 1522402 A | 8/2004 |
|---|---|---|
| CN | 1655123 A | 8/2005 |

(Continued)

OTHER PUBLICATIONS

"Processor Resource/Systems Manager Planning Guide," IBM Publication No. SB10-7036-04, Fifth Edition, Jan. 2005.

(Continued)

*Primary Examiner* — Scott Sun
(74) *Attorney, Agent, or Firm* — John E. Campbell; Blanche E. Schiller, Esq.; Heslin Rothenberg Farley & Mesiti P.C.

(57) ABSTRACT

A facility is provided to enable operator message commands from multiple, distinct sources to be provided to a coupling facility of a computing environment for processing. These commands are used, for instance, to perform actions on the coupling facility, and may be received from consoles coupled to the coupling facility, as well as logical partitions or other systems coupled thereto. Responsive to performing the commands, responses are returned to the initiators of the commands.

15 Claims, 23 Drawing Sheets

(56) References Cited

U.S. PATENT DOCUMENTS

| | | | |
|---|---|---|---|
| 6,463,582 | B1 | 10/2002 | Lethin et al. |
| 6,591,228 | B1 | 7/2003 | Hall et al. |
| 6,848,037 | B2 | 1/2005 | Flaherty et al. |
| 7,668,186 | B1 | 2/2010 | Nelson, IV et al. |
| 7,693,000 | B2 * | 4/2010 | Taruishi et al. .......... 365/230.03 |
| 8,112,669 | B2 | 2/2012 | Zimmerman |
| 8,315,377 | B2 | 11/2012 | Daloz et al. |
| 8,359,620 | B2 | 1/2013 | Choi et al. |
| 2002/0066051 | A1 | 5/2002 | Hobson et al. |
| 2003/0065977 | A1 | 4/2003 | Jones et al. |
| 2003/0188038 | A1 | 10/2003 | Le et al. |
| 2005/0198170 | A1 | 9/2005 | LeMay et al. |
| 2006/0176903 | A1 * | 8/2006 | Coulier ........................ 370/466 |
| 2009/0006537 | A1 | 1/2009 | Pelakar et al. |
| 2009/0138119 | A1 | 5/2009 | Co et al. |
| 2010/0023655 | A1 | 1/2010 | Hirayama |
| 2010/0049937 | A1 | 2/2010 | Chauvet et al. |
| 2010/0235899 | A1 | 9/2010 | Li et al. |
| 2012/0317312 | A1 | 12/2012 | Elko et al. |
| 2012/0317402 | A1 | 12/2012 | Elko et al. |
| 2012/0317436 | A1 | 12/2012 | Elko et al. |
| 2012/0317584 | A1 | 12/2012 | Elko et al. |
| 2012/0317585 | A1 | 12/2012 | Elko et al. |
| 2013/0074099 | A1 | 3/2013 | Elko et al. |
| 2013/0081057 | A1 | 3/2013 | Elko et al. |
| 2013/0086428 | A1 | 4/2013 | Elko et al. |

FOREIGN PATENT DOCUMENTS

| | | | |
|---|---|---|---|
| CN | 101276293 | A | 10/2008 |
| GB | 2357169 | A | 6/2001 |
| GB | 2362233 | A | 11/2001 |
| KR | 20020029508 | A | 4/2002 |

OTHER PUBLICATIONS

"z/Architecture—Principles of Operation," IBM Publication No. SA22-7832-08, Aug. 2010.

Office Action for U.S. Appl. No. 13/157,918 dated Jul. 12, 2012.

International Search Report and Written Opinion for PCT/IP2012/052833 dated Oct. 18, 2012.

International Search Report and Written Opinion for PCT/IP2012/052834 dated Oct. 18, 2012.

International Search Report and Written Opinion for PCT/IP2012/052835 dated Oct. 18, 2012.

International Search Report and Written Opinion for PCT/IP2012/052837 dated Oct. 18, 2012.

Office Action for U.S. Appl. No. 13/157,935 dated May 28, 2013, pp. 1-36.

Office Action for U.S. Appl. No. 13/676,902 dated May 29, 2012, pp. 1-24.

Office Action for U.S. Appl. No. 13/157,913 dated Sep. 25, 2013, pp. 1-20.

Office Action for U.S. Appl. No. 13/684,322 dated Oct. 7, 2013, pp. 1-12.

Office Action for U.S. Appl. No. 13/157,910 dated Nov. 12, 2013, pp. 1-25.

Office Action for U.S. Appl. No. 13/157,905 dated Jan. 29, 2014, pp. 1-23.

Office Action for U.S. Appl. No. 13/681,580 dated Jan. 29, 2014, pp. 1-18.

* cited by examiner

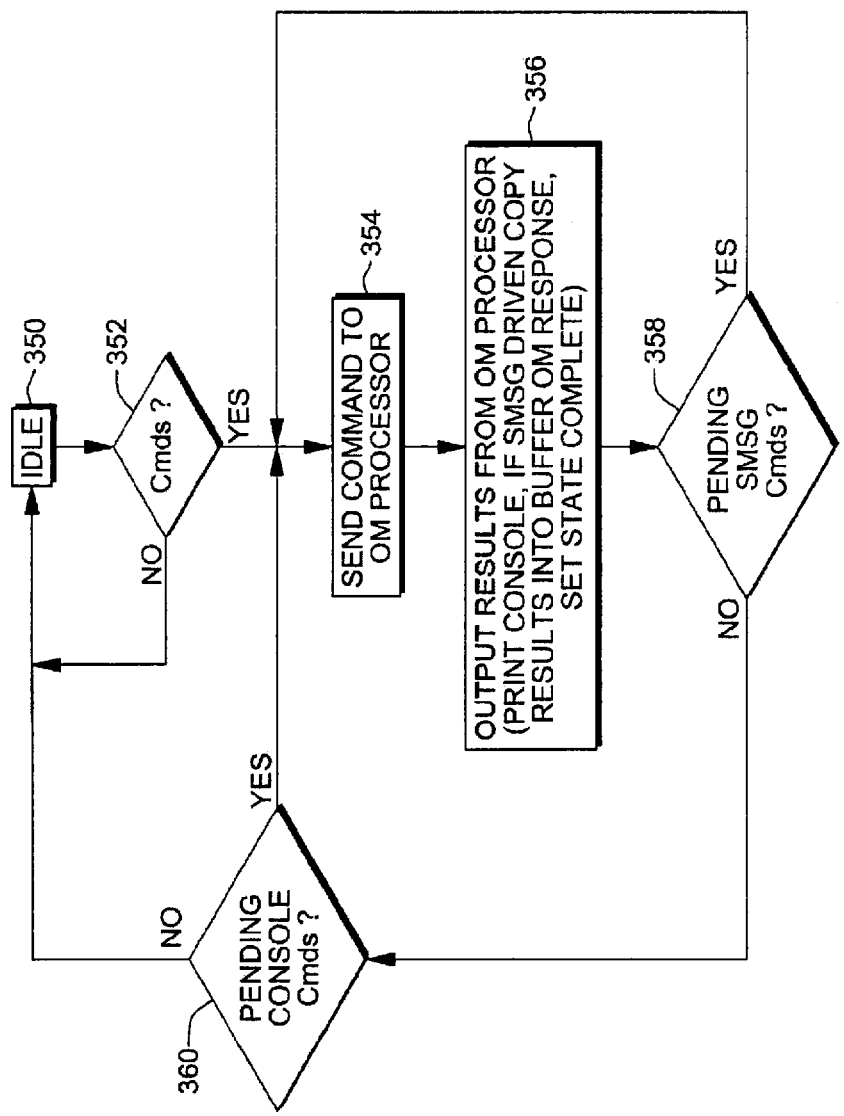

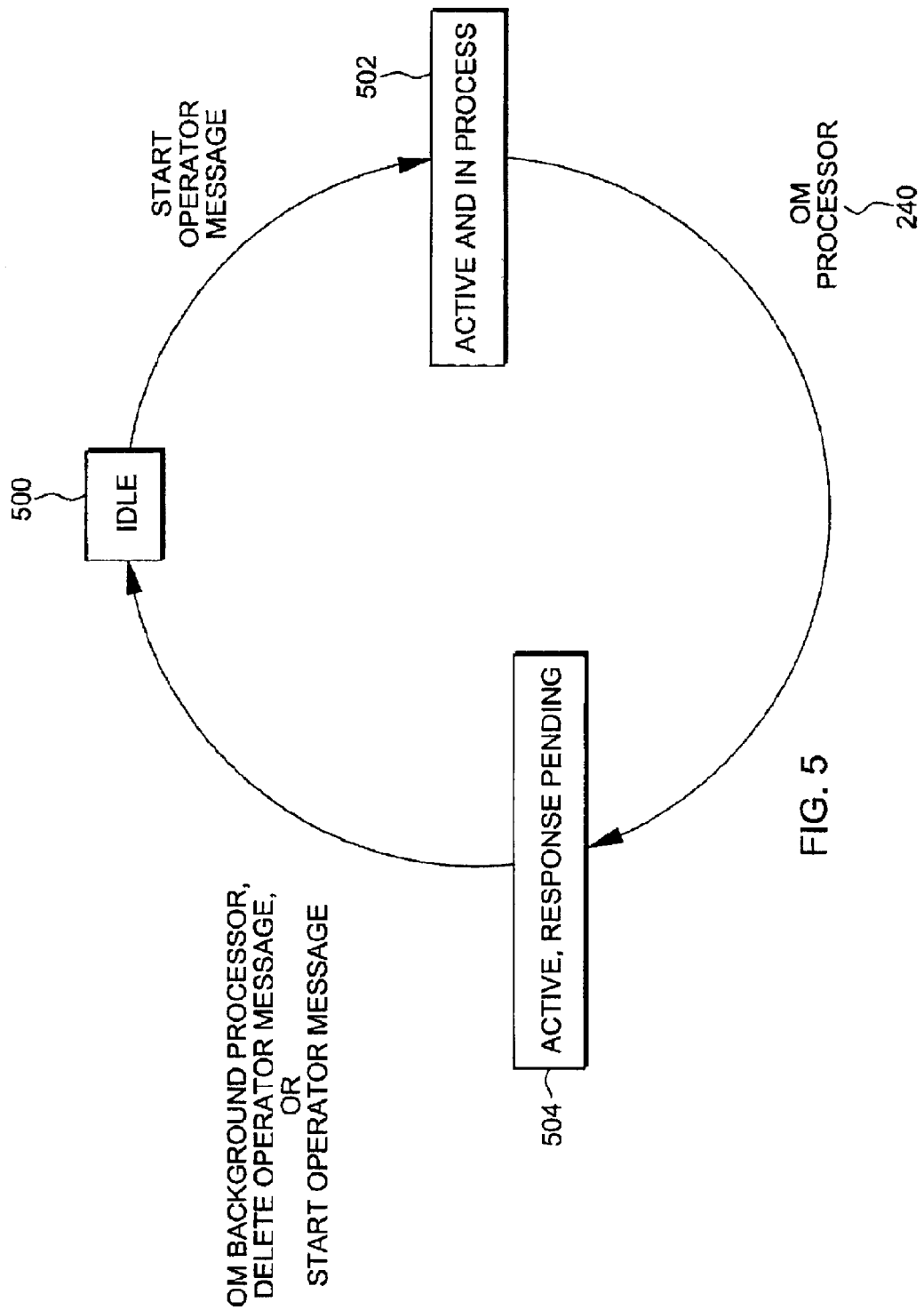

US 8,788,719 B2

EXECUTING A START OPERATOR MESSAGE COMMAND

This application is a continuation of co-pending U.S. Ser. No. 13/157,910, entitled "EXECUTING A START OPERATOR MESSAGE COMMAND," filed Jun. 10, 2011, which is hereby incorporated herein by reference in its entirety.

BACKGROUND

One or more aspects of the present invention relate, in general, to processing within a computing environment, and in particular, to processing operator message commands within the computing environment.

Computing environments range from simple environments to more complex environments. A simple environment may include one processor executing one operating system, while a complex environment may include a plurality of processors or a plurality of isolated memory spaces executing various kinds of systems. For instance, a complex environment may include one or more logical partitions executing one or more operating systems and at least one logical partition executing coupling facility control code. Regardless of whether the computing environment is simple or complex, it is necessary to adequately test the components of the computing environment to ensure reliability and an acceptable level of performance.

One technique for testing components of a computing environment is by issuing operator commands at a console connected to the components, which are then processed by the intended components of the computing environment. Once the operator commands are processed, results are returned to the console for verification by the operator of the console.

Operator commands may also be used for purposes other than testing. Again, these operator commands are issued by an operator at a console and processed by the intended components of a computing environment.

BRIEF SUMMARY

The shortcomings of the prior art are overcome and advantages are provided through the provision of a method of processing a start command in a computing environment comprising a coupling facility coupled to one or more processor images. The method includes, for instance, receiving by the coupling facility from a processor image coupled thereto a start operator message command, the start operator message command including a message command block including a message header, an indication of the start operator message command, an operator message request that includes an operator message command to be processed by the coupling facility, an operator message request length and an operator message token; based on receiving the start operator message command, processing the start operator message command, wherein the processing includes: storing within a selected buffer of one or more buffers the operator message token, the operator message request and the operator message request length, wherein the operator message token uniquely identifies the operator message command and associates the selected buffer with the operator message command; setting within the selected buffer a timer to current time; setting a state of the selected buffer; and providing a response code for the start operator message command.

Computer program product and systems relating to one or more aspects of the present invention are also described and may be claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

FIG. 3B depicts one example of the logic used by the multiplexor of FIG. 3A to control processing of operator message commands, in accordance with an aspect of the present invention;

FIG. 5 depicts examples of various possible states of a buffer, in accordance with an aspect of the present invention;

DETAILED DESCRIPTION

Figure 1:
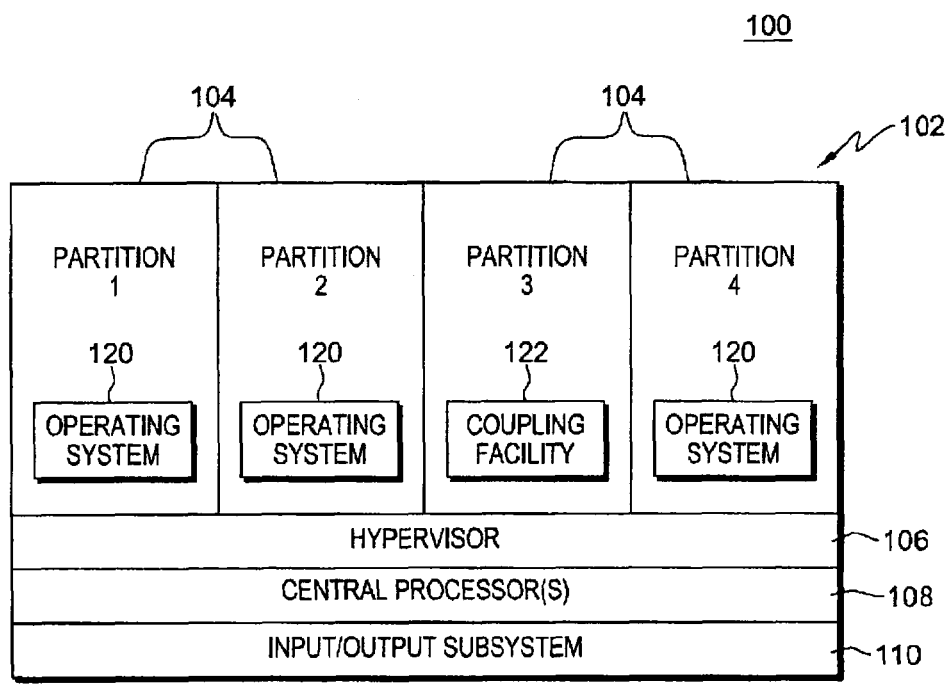
FIG. 1 depicts one example of a computing environment to incorporate and use one or more aspects of the present invention.

In accordance with one or more aspects of the present invention, a capability is provided to facilitate processing of operator message commands received from one or more sources. In one example, the operator message commands are received by a coupling facility from the one or more sources, and the coupling facility processes the commands and returns responses to the source(s). In one particular example, at least one of the sources is a processor image coupled to, but separate from, the coupling facility. As examples:

- The processor image is a logical partition having central processor resources associated therewith and capable of executing an operating system, and the coupling facility is within another logical partition having central processor resources associated therewith and capable of executing coupling facility control code, in which both logical partitions are within the same central processing complex (i.e., the same machine);
- The processor image is a logical partition having central processor resources associated therewith and capable of executing an operating system, and the coupling facility is within another logical partition having central processor resources associated therewith and capable of executing coupling facility control code, in which both logical partitions are within different central processing complexes (i.e., the different machines); and
- The processor image is a stand-alone machine (not virtualized in a logical partition) separate from a machine or logical partition capable of executing the coupling facility.

Each processor image includes one or more processors.

Examples of coupling facility operator commands include:
Configure—take CHPID (Channel Path) on or off line; CP—take CP (Central Processor) on or off line; Display—show resources; Help <command>—command specific help; Locate—display SID (subchannel id) vector or SID frames; Mode—set volatility mode; PRY—turn PRY (machine level debug tool) on or off; Retrieve—retrieve coupling facility (CF) information; Rideout—set power failure rideout time; RType—set response type; Shutdown—terminate CF operation; SMI—turn System Monitor Instrument on or off; Timezone—set timezone offset; Trace—set trace control; Patch—apply concurrent patch; Dyndisp—turn dynamic coupling facility dispatching on or off; MTO—turn MTO (message time out) for commands table on; VMDUMP—force a coupling facility hardlong on VM; CFDUMP—force non-disruptive dump; and NDDUMP—nddump_command. These commands are described in "Processor Resource/Systems Manager Planning Guide", IBM Publication No. SB10-7036-04, Fifth Edition, January 2005, which is hereby incorporated herein by reference in its entirety.

In one particular example, the commands are testing the coupling facility in that the commands specify an action to be taken on the coupling facility, the action is performed, results are sent back to the initiator of the command (e.g., operating system console, coupling facility console, test program) and those results are analyzed either manually by an operator, analyst, etc. or programmatically. By enabling operator message commands that take action on the coupling facility to be initiated and/or sent from remote sources other than a coupling facility console, testing that can be performed on the coupling facility is enhanced, as well as operations that can be performed. This may result in increased reliability and/or performance of the coupling facility.

One embodiment of a computing environment to incorporate and/or use one or more aspects of the present invention is described with reference to FIG. 1. In one example, a computing environment 100 includes a central processor complex (CPC) 102, which is based on the z/Architecture® offered by International Business Machines Corporation (IBM®). Aspects of the z/Architecture® are described in an IBM® publication entitled "z/Architecture Principles of Operation," IBM Publication No. SA22-7832-08, August 2010, which is hereby incorporated herein by reference in its entirety. One system that may include central processor complex 102 is the zEnterprise 196 (z196) system offered by International Business Machines Corporation. IBM® and z/Architecture® are registered trademarks, and zEnterprise 196 and z196 are trademarks of International Business Machines Corporation, Armonk, N.Y., USA. Other names used herein may be registered trademarks, trademarks or product names of International Business Machines Corporation or other companies.

Central processor complex 102 includes, for instance, one or more partitions (processor images) 104, a hypervisor partition 106, one or more central processors 108, and one or more components of an input/output subsystem 110. Partitions may be physical partitions or logical partitions 104 (e.g., LPARS), and each partition includes a set of the system's hardware resources (physical or virtualized) as a separate system capable of running operating system software.

Each logical partition 104 is capable of functioning as a separate system. That is, each logical partition can be independently reset, initially loaded with an operating system or other control code, if desired, and operate with different programs. An operating system or application program running in a logical partition appears to have access to a full and complete system, but in reality, only a portion of it is available. A combination of hardware and licensed internal code (LIC), referred to as firmware, keeps a program in one logical partition from interfering with a program in a different logical partition. This allows several different logical partitions to operate on a single or multiple physical processors in a timeslice manner. (As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.)

In this example, several of the logical partitions have a resident operating system (OS) 120, which may differ for one or more logical partitions. In one embodiment, at least one logical partition is executing the z/OS® operating system, offered by International Business Machines Corporation, Armonk, N.Y. Further, at least one logical partition is executing coupling facility control code (CFCC) 122, also offered by IBM®, and therefore, is referred to as a coupling facility.

A coupling facility is, for instance, a non-volatile shared storage device (e.g., hardware) that includes multiple storage structures, such as cache, list and/or lock structures, which are used to provide unique functions for the computing environment. It is a shareable facility having storage and processing capabilities. For instance, a coupling facility is a processor with memory and special channels (CF Links) that executes coupling facility control code (CFCC), rather than a standard operating system. Information in the coupling facility resides in memory as CFCC, and the coupling facility does not have I/O devices, other than the CF links. An implementation of a coupling facility (a.k.a., Structured External Storage) is described in U.S. Pat. No. 5,317,739, entitled "Method and Apparatus for Coupling Data Processing System," Elko et al., issued May 31, 1994, which is hereby incorporated herein by reference in its entirety.

Logical partitions 104 are managed by hypervisor 106, which is implemented by firmware running on central processors 108. Logical partitions 104 and hypervisor 106 each comprises one or more programs residing in respective portions of main memory associated with the central processors. One example of hypervisor 106 is the Processor Resource/Systems Manager (PR/SM™), offered by International Business Machines Corporation, Armonk, N.Y.

Central processors 108 are physical processor resources that are allocated to the logical partitions. For instance, a logical partition 104 includes one or more logical processors, each of which represents all or a share of a physical processor resource 108 allocated to the partition. The logical processors of a particular partition 104 may be either dedicated to the partition, so that the underlying processor resource is reserved for that partition; or shared with another partition, so that the underlying processor resource is potentially available to another partition.

Input/output subsystem 110 (of which only a portion is depicted) provides connectivity to I/O devices. In one particular example of the z/Architecture®, the I/O subsystem includes a channel subsystem, which directs the flow of information between I/O devices and main storage. However, the I/O subsystem may be other than a channel subsystem.

The channel subsystem uses one or more channel paths as the communication link in managing the flow of information to or from the I/O devices. Within the channel subsystem are subchannels.

One subchannel is provided for and dedicated to each I/O device accessible to the channel subsystem. Each subchannel contains storage for information concerning the associated I/O device and its attachment to the channel subsystem. The subchannel also provides storage for information concerning I/O operations and other functions involving the associated I/O device. Information contained in the subchannel could be accessed by CPUs using I/O instructions as well as by the channel subsystem and serves as the means of communication between any CPU and the channel subsystem concerning the associated I/O device.

Although a logically partitioned environment is described herein as one computing environment to incorporate and use one or more aspects of the present invention, other environments may also incorporate and/or use one or more aspects of the present invention. For instance, an environment having one or more processors coupled to a coupling facility (not a logically partitioned environment) may also incorporate and use one or more aspects of the present invention. Other examples are also possible.

Figure 2A:
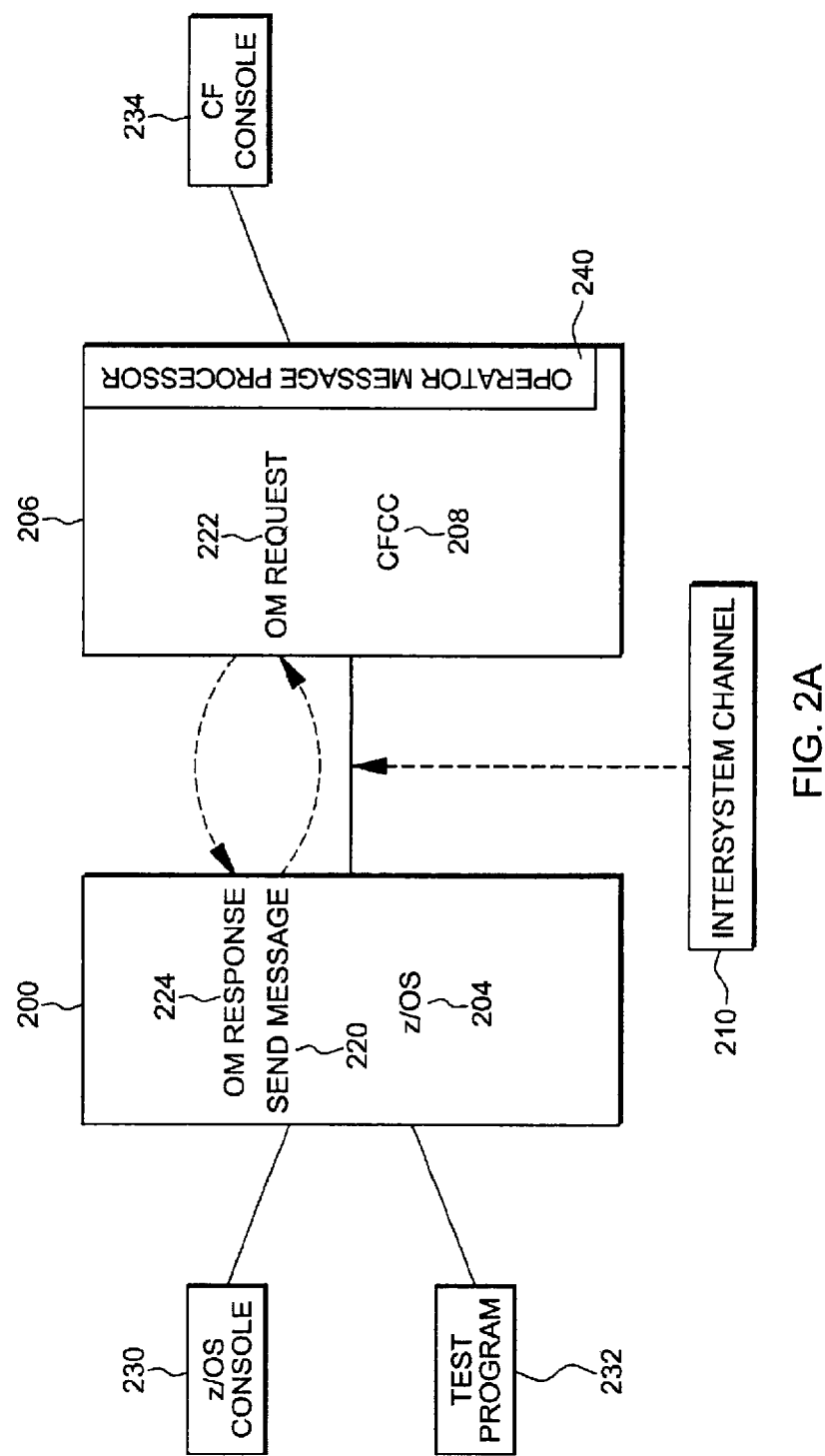
FIG. 2A depicts one example of a processor of the computing environment of FIG. 1 communicating with a coupling facility of the computing environment, in accordance with an aspect of the present invention.

Communication between a processor and a coupling facility, whether or not in a logically partitioned environment, is facilitated by one or more intersystem channels, as depicted in FIG. 2A. In the example described herein, the communication is between logical partitions. For instance, a logical partition 200 executing an operating system 204, such as the z/OS® operating system, communicates with a logical partition 206 executing coupling facility control code 208 via at least one intersystem channel 210. In particular, in one example, logical partition 200 communicates with logical partition 206 over the intersystem channel(s) via a Send Message (SMSG) protocol 220.

In one example, the Send Message protocol includes a Send Message instruction which initiates a message operation. The message operation is controlled by information in the Send Message instruction, as well as a message operation block indicated in the Send Message instruction. The message operation includes executing a command specified in a message command block (e.g., for one or more aspects of the present invention, a Start Operator Message command, a Read Operator Message command and/or a Delete Operator Message command, described below). Further, during performance of the operation, response information is stored in a message response block in main storage.

Figure 2B:
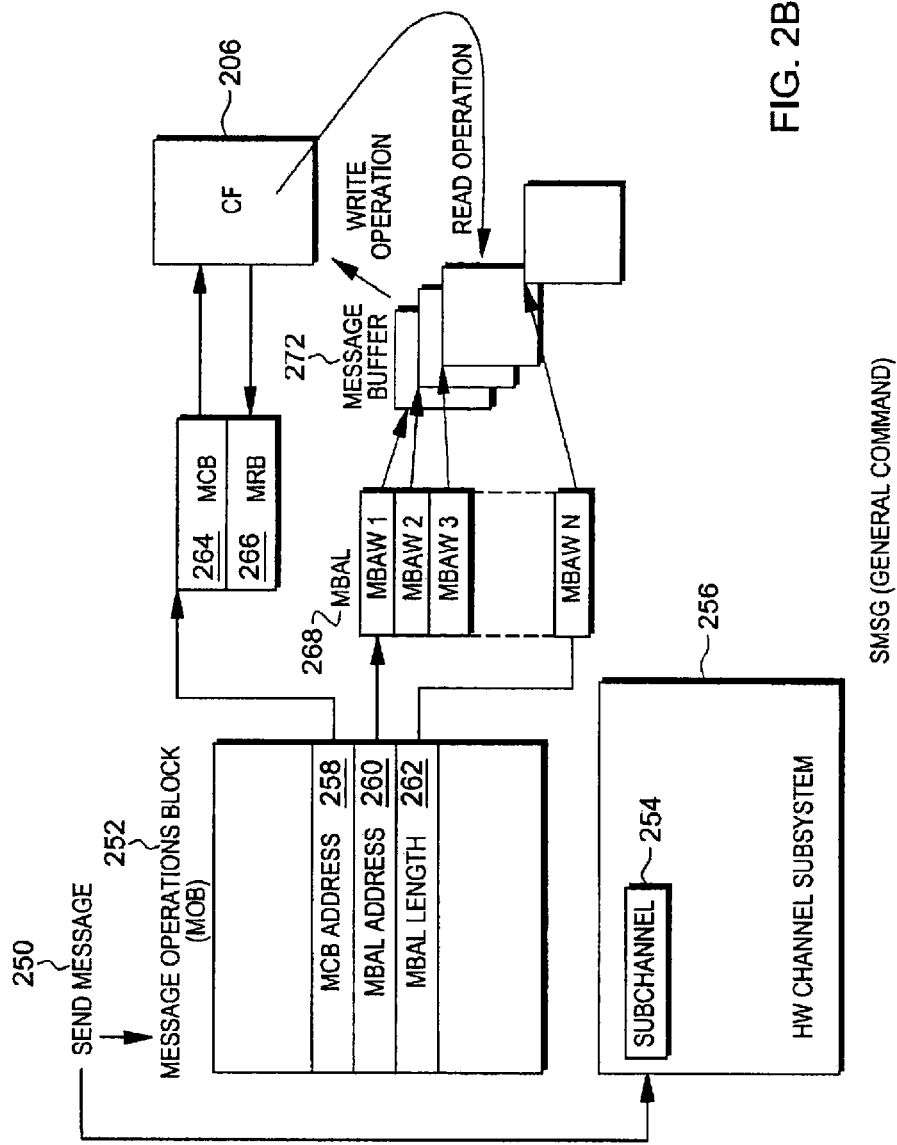
FIG. 2B depicts one embodiment of details relating to a Send Message instruction used in accordance with an aspect of the present invention.

Further details regarding the Send Message protocol are described with reference to FIG. 2B. A send message instruction 250 has two operands, including a message operations block (MOB) 252 and a designation of a subchannel 254 located in a channel subsystem 256. The message operations block includes, for instance, a message command block address 258 pointing to a message command block 264/message response block 266 pair. These are 256-byte buffers located in main memory. Message operations block 252 also includes a message buffer address list (MBAL) address 260 that points to a message buffer address list 268. The MBAL list is a variable length list from, for instance, 1-16. It includes one or more message buffer address words (MBAWs) 268 that designate one or more message buffers 272. The buffers may be a source for write operations to coupling facility 206 or a target of read operations from the coupling facility. Also included in message operation block 252 is a MBAL length 262 that indicates the length of the MBAL list. Not all commands have to have a message buffer address list, and therefore, the length could be zero. Message command block 264 includes the parameters that are sent to the coupling facility, and when a response comes back it is stored directly to the MRB.

When Send Message is executed, parameters from the message operation block are passed to the CPU or channel subsystem requesting that a send function be performed with the coupling facility associated with a specified subchannel of the channel subsystem. The send function is performed synchronously or asynchronously to Send Message.

The send function is performed by using information in the subchannel to find a path to the coupling facility. Using the path, the message operation is forwarded to the coupling facility. For instance, execution of the message operation is accomplished by passing command information to the coupling facility, decoding and executing the command, formulating response information indicating the result, and storing the response information in the message response block.

Status indications summarizing conditions detected during the execution of the send function are placed at the subchannel and made available to the operating system. Additional details regarding Send Message are described in U.S. Pat. No. 5,561,809, entitled "In A Multiprocessing System Having A Coupling Facility, Communicating Messages Between The Processors And The Coupling Facility In Either A Synchronous Operation Or An Asynchronous Operation," Elko et al., issued Oct. 1, 1996, which is hereby incorporated herein by reference in its entirety.

Continuing with FIG. 2A, in this example, coupled to logical partition 200 are one or more operating system consoles 230, as well as one or more test programs 232, which may be running within the same logical partition, the same central processing complex but a different logical partition, or another system. Similarly, coupled to logical partition 206 is at least one coupling facility console 234. Each console enables a user to enter operator message commands to its respective logical partition. Further, test program 232 is also able to issue operator message commands to its respective logical partition. Operator message commands issued to logical partition 206 (also referred to herein as the coupling facility) from console 234 are received, in one example, by an operator message processor 240 within the coupling facility that services the commands received from the coupling facility console.

Prior to one or more aspects of the present invention, the only remote entity that could send coupling facility operator message commands directly to the coupling facility and receive responses back was the coupling facility console. The testing of coupling facility operator commands required a person to log onto the coupling facility console to issue the commands and verify the results. Other remote entities, such as operating systems, operating system consoles, test programs, and/or other remote systems, could not directly access the coupling facility to have operator message commands processed and the results returned. Instead, any such commands had to be forwarded to the coupling facility console, and since some commands could not be forwarded, those commands could not be processed by the coupling facility. Any results of commands processed by the coupling facility would be returned to the coupling facility console and displayed on the console.

In accordance with one or more aspects of the present invention, operator message commands are received at the coupling facility from console 234, as well as logical partition 200 (and/or other logical partitions, processors, systems, etc.). For instance, operator message commands are received at logical partition 200 from consoles 230 and/or test programs 232 (as well as other possible initiators), and then forwarded from logical partition 200 to logical partition 206. To forward an operator message command from logical partition 200 to logical partition 206, in one example, an operator message (OM) request 222 is sent from logical partition 200 to logical partition 206 using the Send Message protocol over the intersystem channel(s). The request includes, for instance, a command that specifies the requested operator message command. The coupling facility processes the request and using SMSG sends an operator message (OM) response 224 back from logical partition 206 to logical partition 200.

Since the coupling facility is now able to receive operator message commands from multiple, distinct sources, including, for instance, a coupling facility console and one or more logical partitions (or other processors, systems, etc.) coupled thereto, controls are provided within the coupling facility to manage the multiple requests to be processed. One such control is a multiplexor, an example of which is depicted in FIG. 3A.

Figure 3A:
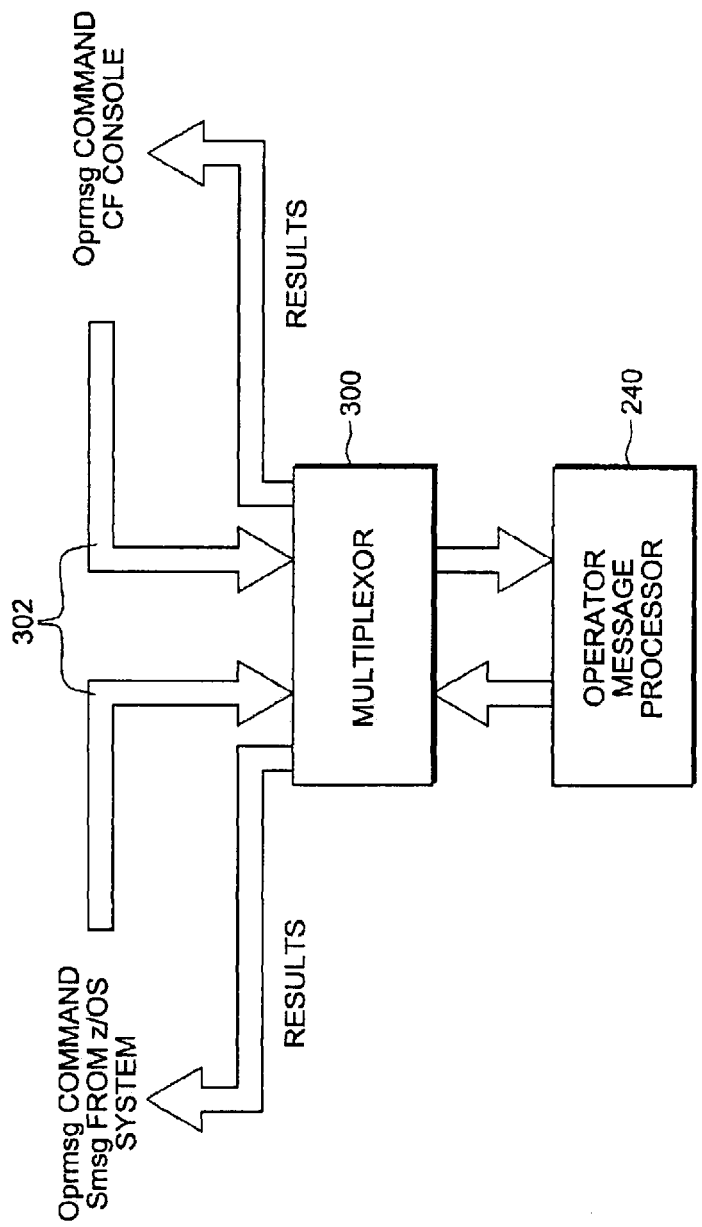
FIG. 3A depicts one example of a multiplexor used to control processing of operator message commands received at the coupling facility, in accordance with an aspect of the present invention.

As shown in FIG. 3A, a multiplexor 300 receives operator message commands from multiple sources 302, including a logical partition executing an operating system and the coupling facility console, as examples. In particular, in one example, the multiplexor receives operator message commands directly from the coupling facility console, and directly from the logical partition via a Start Operator Message command sent using SMSG. The multiplexor is located within the coupling facility and is coupled to operator message processor 240. Thus, the operator message commands issued from the coupling facility console are now forwarded to the multiplexor, which directs the forwarding of those commands to the operator message processor. Similarly, operator message commands received from the logical partition (or other remote entities) are also input to multiplexor 300. Further, other commands issued by the logical partition that are associated with the processing of the operator message commands (e.g., Read Operator Message and Delete Operator Message) are also input to multiplexor 300. Thus, for convenience, the commands that include the operator message commands, as well as other operations associated therewith, are referred to herein as SMSG commands. The multiplexor directs the received commands (i.e., the operator message commands from the coupling facility console and the SMSG commands) to the operator message processor.

One embodiment of the logic used by the multiplexor to control selection of commands to be processed by the operator message processor is described with reference to FIG. 3B. Initially, the multiplexor is idle, waiting for commands to be received, STEP 350. If there are no commands, INQUIRY 352, then the multiplexor remains idle, STEP 350. Otherwise, if at least one command is received, one of the commands is sent to the operator message processor for processing, STEP 354. For example, the first command that is received is sent or if both operator message commands and SMSG commands are received, in this example, one of the SMSG commands is sent.

The operator message processor processes the command, as described further below, and outputs the results, STEP 356. If the command is from the coupling facility console, the results are output to the console. However, if the command is from a processor, then the results are stored in a buffer, as described below, and provided to the coupling facility console, in this example.

Thereafter, a determination is made as to whether there are any pending commands from sources other than the coupling facility console (e.g., pending SMSG commands), INQUIRY 358. If there is at least one pending SMSG command, processing continues with STEP 354 in which a command is selected and sent to the operator message processor. Otherwise, a check is made to see if there are any pending commands from the coupling facility console, INQUIRY 360. If there is one or more pending console commands, then processing continues with STEP 354. However, if there are no more pending console commands, then processing continues to STEP 350.

Multiple commands may be received from one or more logical partitions coupled to the coupling facility (i.e., from non-CF logical partitions, which are partitions that do not include coupling facility control code). Thus, the coupling facility includes one or more buffers (referred to herein as operator message (OM) processing buffers) to store the incoming commands from such partitions. Further details regarding the buffers are described with reference to FIGS. 4A-4B.

Figure 4A:
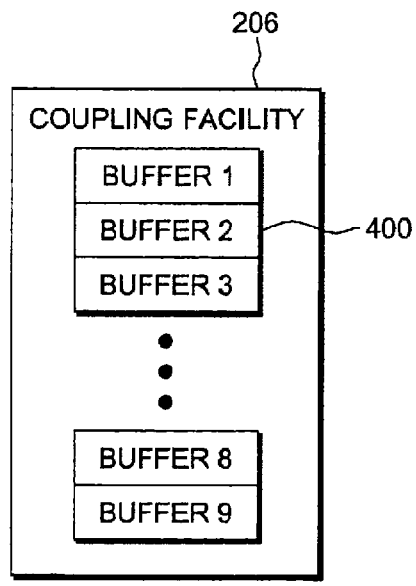
FIG. 4A depicts one example of buffers used in processing operator message commands, in accordance with an aspect of the present invention.

Referring to FIG. 4A, in one example, the coupling facility includes one or more buffers 400. In this example, there are nine buffers, but this number of buffers is configurable. Each buffer 400 has a plurality of controls associated therewith, as described with reference to FIG. 4B.

Figure 4B:
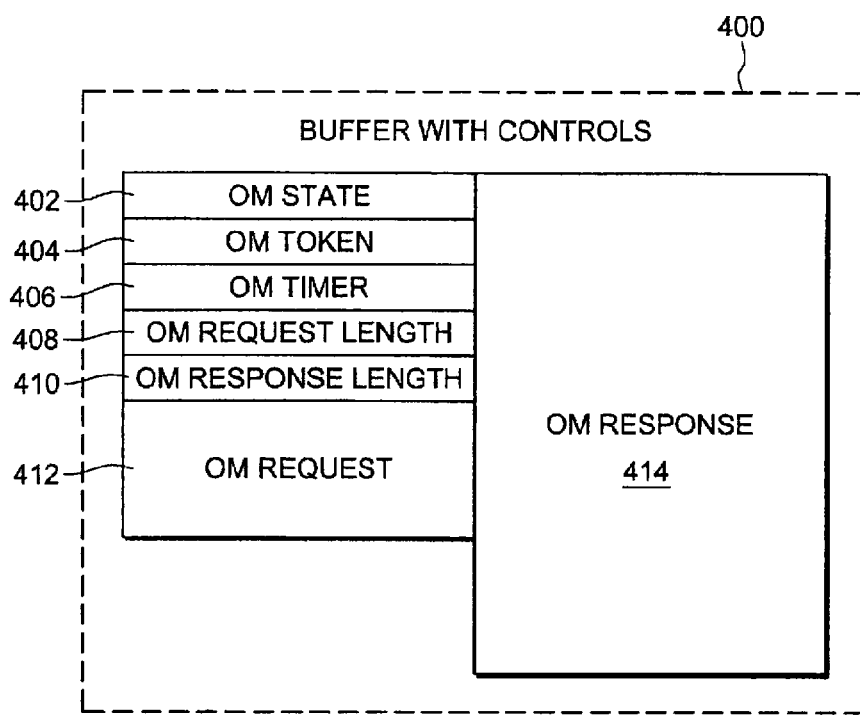
FIG. 4B depicts one example of further details of a buffer of FIG. 4A, in accordance with an aspect of the present invention.

With reference to FIG. 4B, buffer 400 includes, for instance:

Operator message state 402, which indicates the state of the buffer including idle; active and in process; or active, response pending, as described below.

Operator message token (OMTK) 404, which is a value provided by the operating system (e.g., the operating system console, which includes operating system code, or the portion of the operating system running in the logical partition) when the operator message process is started. The operator message token uniquely identifies the operator message request. When the operator message processing buffer is idle, the operator message token contains zeros. This token is used to identify a buffer, once it is selected.

Operator message timer (OMT) 406, which is a time-of-day value that is set when the operator message request is started. It is set to the current value of the time-of-day clock. The operator message timer is used to determine the length of time that the operator message has been active. When the operator message processing buffer is idle, the operator message timer contains zeros.

Operator message request length (OMREQL) 408, which is a value that contains the length, in bytes, of the OM request (e.g., the operator message command). When the OM processing buffer is idle, the value of the OMREQL object is zero.

Operator message response length (OMRESL) 410, which is a value that contains the length, in bytes, of the OM response. When the OM processing buffer is idle or when the OM processing buffer is active and processing, the value of the OMRESL object is zero.

Operator message request data (OMREQD) 412, which includes the contents of the OM request passed into the coupling facility by the Start Operator Message command (described below). When the OM processing buffer is idle, the contents of the OM request data are undefined.

Operator message response data (OMRESD) 414, which includes the results of the operator message command. When the operator message processing buffer is idle, or when the operator message processing buffer is active and processing, the contents of the OM response data are undefined.

As described above, each buffer has various states associated with it. Referring to FIG. 5, initially, a buffer is in the idle state 500. This indicates that it is available for starting a message. Responsive to a Start Operator Message command, the buffer transitions into an active and in process state 502, which indicates that the operator message command is being processed by the coupling facility. In particular, operator message processor 240 processes the request, including the operator message command, in the background and provides a response. Responsive to generating the response, the buffer is placed in an active, response pending state 504. At this point, a read operation that is querying the buffers can access the buffer and read out the response.

Thereafter, the buffer may be returned to the idle state via for instance, a timeout that the coupling facility (i.e., the operator message processor) recognizes, or explicitly by a Delete Operator Message or Start Operator Message. Further details regarding the buffers and processing thereof are described below.

An operator message (OM) processing buffer is an area of coupling facility storage that contains information related to the processing of an operator message command sent via the Start Operator Message (SOM) command. The OM processing buffer is assigned from an area of coupling facility storage that is not available for structure allocation.

The OM processing buffer is either active or idle. When idle, it is available for selection by the Start Operator Message (SOM) command. When active, an operator message process has been started and has not yet been deleted. If the operator message response is available, the buffer state is active with response pending. Otherwise, the buffer state is active and processing.

Deleting an active operator message process with response pending resets the objects associated with the OM processing buffer and places the buffer in the idle state (a.k.a., resetting an OM processing buffer).

There are three ways an active operator message process can be deleted:

1. A Delete Operator Message command is executed that specifies an OM token that matches the OM token object and the OM processing buffer is active with response pending.
2. The length of time that the operator message process has been active exceeds the value of the OM timeout control and the OM processing buffer is active with response pending. This may be detected by an internal coupling facility process or by a Start Operator Message command.
3. A Start Operator Message command is executed that specifies an OM token that matches the OM token object and the OM processing buffer is active with response pending, and all message buffers are busy and at least one has timed out.

A lag in time may occur between the time the OM processing buffer times out and when it is detected as timed out and reset to the idle state. In this case, the OM processing buffer remains active with response pending until the OM request is deleted.

Processing an OM request is performed as a background operation. The background process is initiated when a Start Operator Message command successfully completes. The background process generates the OM response data, stores the response data in the OMRESD object and stores the response length in the OMRESL object. It then changes the state of the OM processing buffer to active with response pending.

Further details regarding buffer processing, and in particular, the Operator Message commands are described below. However, prior to that description other objects and operands are described to facilitate understanding of one or more aspects of the present invention.

As an example, the coupling facility includes a number of global objects used to process the operator message commands. These objects include, for instance:

A fixed global control—e.g., an operator message processing buffer count (OMPBC), which is a model-dependent value that specifies the number of OM processing buffers supported by the coupling facility;

Program modifiable global controls—e.g., operator message processing buffers (OMPB), and an operator message timeout control (OMTOC), which is a value that determines the maximum length of time, in seconds, that an operator message is associated with an OM processing buffer. If an operator message has not been explicitly deleted before the timeout value is exceeded, the operator message is deleted by the coupling facility and the OM processing buffer is placed in the idle state. In one example, the default value is 300; and Facility attributes (FACA)—e.g., an operator message facility indicator, which is a value that specifies whether or not the facility described herein for processing operator message commands is supported by the coupling facility.

Further, the coupling facility includes a plurality of global operands used in processing operator message commands. In one example, these operands include:

Operator Message (OM) Request (OMREQ): A variable length byte string with a maximum length of a pre-specified number of bytes (e.g., 192 bytes) that includes the operator message command to be processed. The length is specified by the OM request length.

Operator Message (OM) Response (OMRES): A variable length byte string with a maximum length of a pre-defined number of bytes (e.g., 4096 bytes). The length is specified by the OM response length.

Operator Message (OM) Timeout Control (OMTOC): A value that determines the maximum length of time, in seconds, that an operator message is associated with an OM processing buffer. As an example, valid values range from 5 to 300. This operand is ignored unless the update OMTOC indicator is valid and is set to a value that indicates the OM timeout control is to be updated.

Operator Message (OM) Token (OMTK): A value that uniquely identifies an operator message process.

Update OMTOC Indicator (UOMTCI): A value that indicates whether the operator message timeout control should be updated. It has the following encoding, as examples: do not update the OM timeout control; update the OM timeout control.

Figure 6:
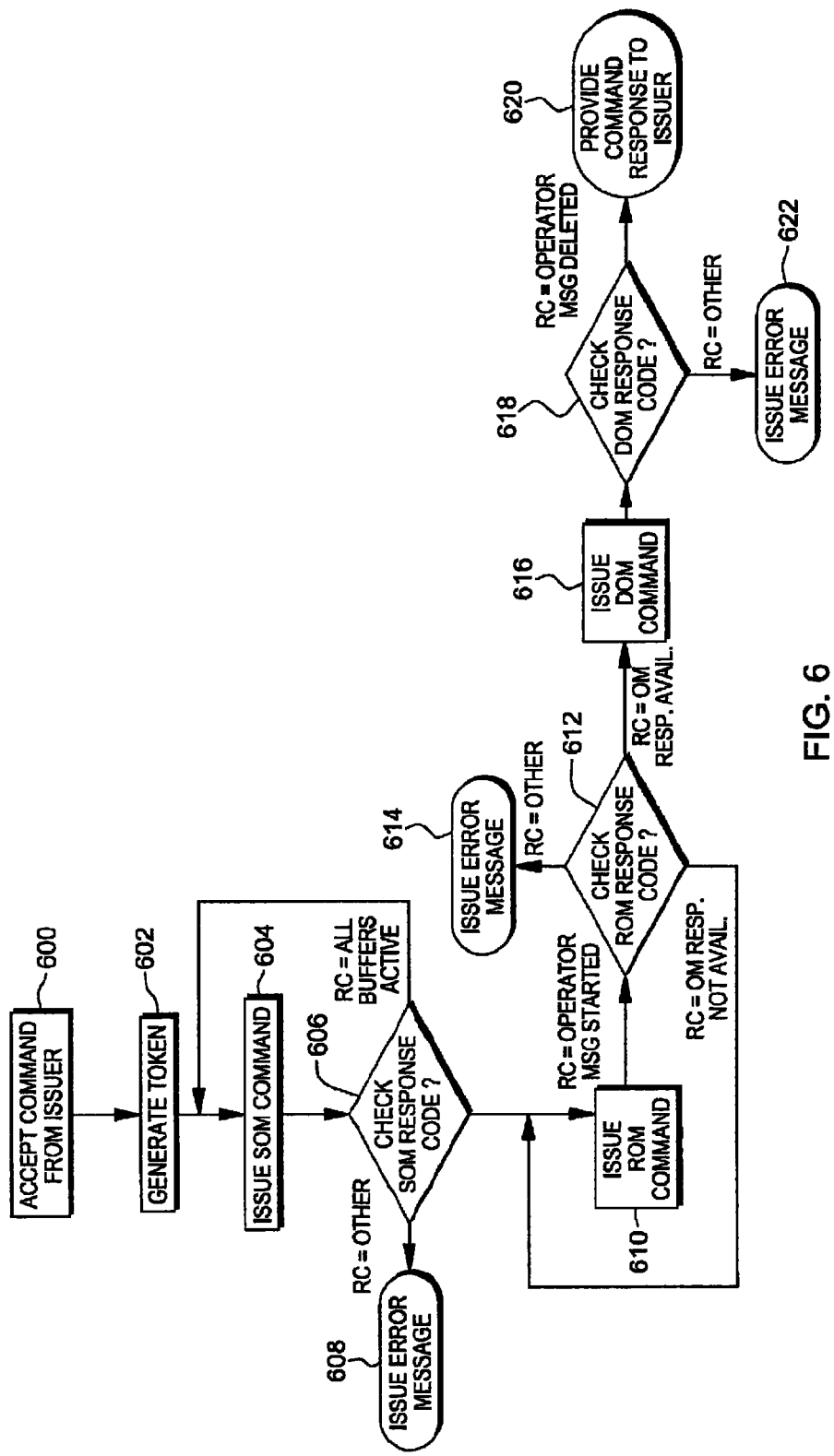
FIG. 6 depicts one embodiment of various commands used in accordance with an aspect of the present invention.

In accordance with one or more aspects the present invention, operator message commands can be sent to the coupling facility from coupling facility consoles, as well as logical partitions or other systems, processors, etc., coupled to the coupling facility. Processing associated with sending operator message commands to the coupling facility from sources other than coupling facility consoles is described with reference to FIG. 6.

Initially, a command is entered or generated by an initiator, such as an operating system console or a test program, as examples, STEP 600. Responsive thereto, the operating system (e.g., the portion executing on the console or executing the test program) generates an operator message token, STEP 602. In one example, the token is generated by concatenating a system identifier with a time-of-day clock value. Thereafter, the initiator issues a Start Operator Message (SOM) request, which includes the token, as well as the requested operator message command, STEP 604. The Start Operator Message request is sent to the logical partition coupled to the initiator.

At the logical partition, the operating system creates the Start Operator Message command by placing the start request, including the token and requested operator message command, in a message command block of the Start Operator Message command. The message command block is then sent from the operating system to the coupling facility via a SMSG command. The multiplexor receives the SMSG command and forwards it to the operator message processor, in due course. The operator message processor then processes the command, as described below. As part of processing, a response is generated.

The response to the Start Operator Message command is forwarded back to the initiator of the SOM. For instance, the response is included in a message response block forwarded to the logical partition via SMSG. Then, from the logical partition, the response is forwarded to the initiator.

The initiator (e.g., operating system console, test program) receives the response and checks the value of the response code, INQUIRY 606. If the response code indicates that all the buffers are already active, and therefore, not available, processing returns to STEP 604. However, if the response code indicates that the operator message has been started, processing continues with STEP 610. Otherwise, an error message is issued, STEP 608.

At STEP 610, a Read Operator Message command is issued by the initiator to read the buffer to obtain the response provided by the coupling facility responsive to processing the operator message command in the Start Operator Message. For instance, a Read Operator Message request issued by the initiator is received at the logical partition (e.g., operating system), which creates the Read Operator Message command and forwards it from the operating system to the coupling facility via SMSG. The coupling facility, and in particular, the multiplexor receives the SMSG command and forwards it, in turn, to the operator message processor. The operator message processor processes the read command, as described below, and sends a response code. The response code is ultimately returned to the initiator, as described above. The response code is checked, INQUIRY 612, and if the response indicates that an OM response is not available, then processing returns to STEP 610. However, if the response code indicates that an OM response is available, then the buffer is read to obtain the results of the requested operator message command. Processing then continues with STEP 616, in one embodiment. Otherwise, an error message is issued, STEP 614.

At STEP 616, a delete operator message request is issued by the initiator and received at the logical partition. The operating system generates a Delete Operator Message command and sends it to the coupling facility via SMSG, as described above. The Delete Operator Message command is processed by the operator message processor, as described below, and a response is returned to the initiator. The initiator checks the response code to the Delete Operator Message command, INQUIRY 618. If the response code indicates that the operator message was deleted, then the OM response is provided to the issuer, STEP 620. Otherwise, an error message is issued, STEP 622.

Figure 7A:
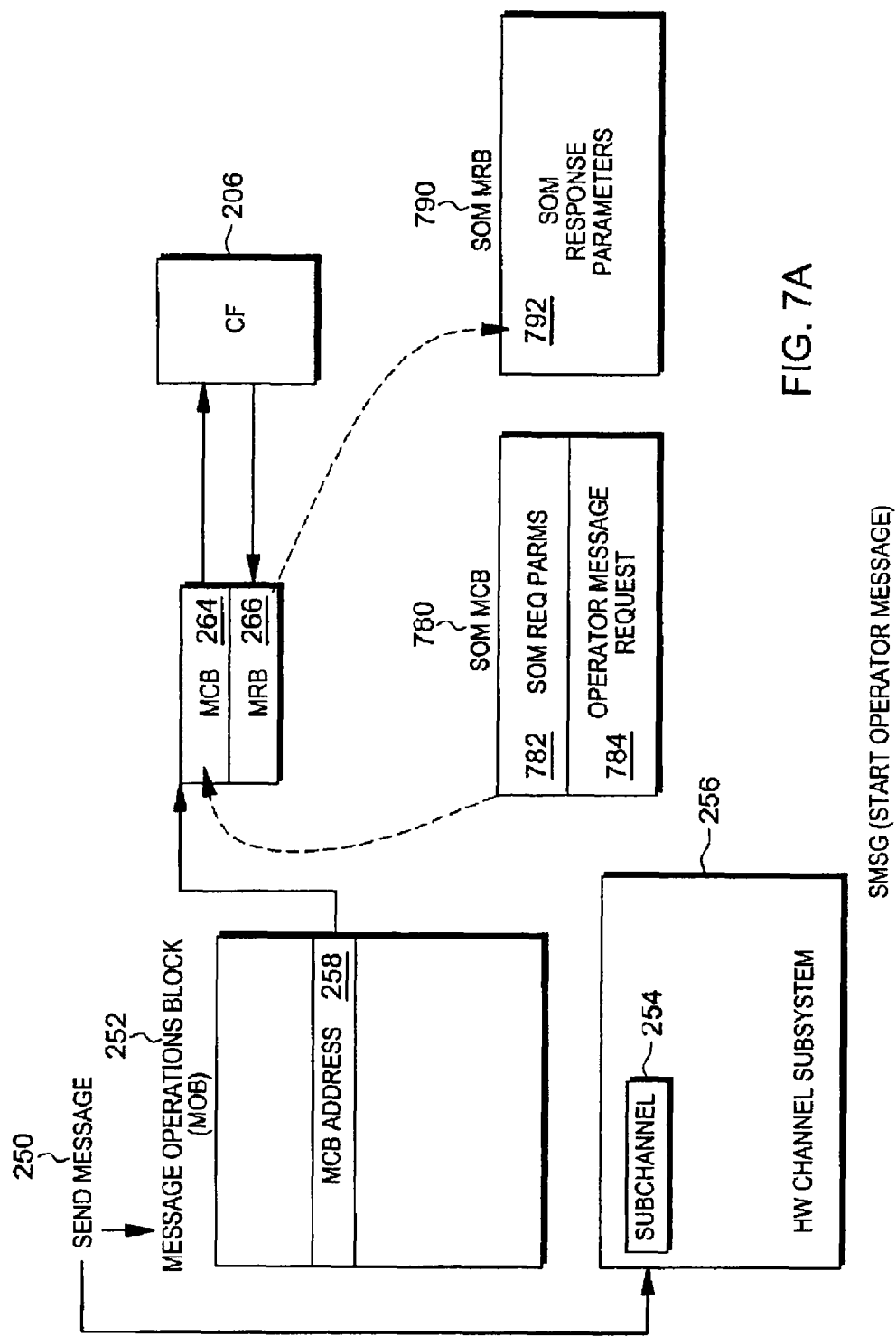
FIG. 7A depicts one embodiment of details relating to using a Send Message instruction to issue a Start Operator Message command, in accordance with an aspect of the present invention.
Figure 7B:
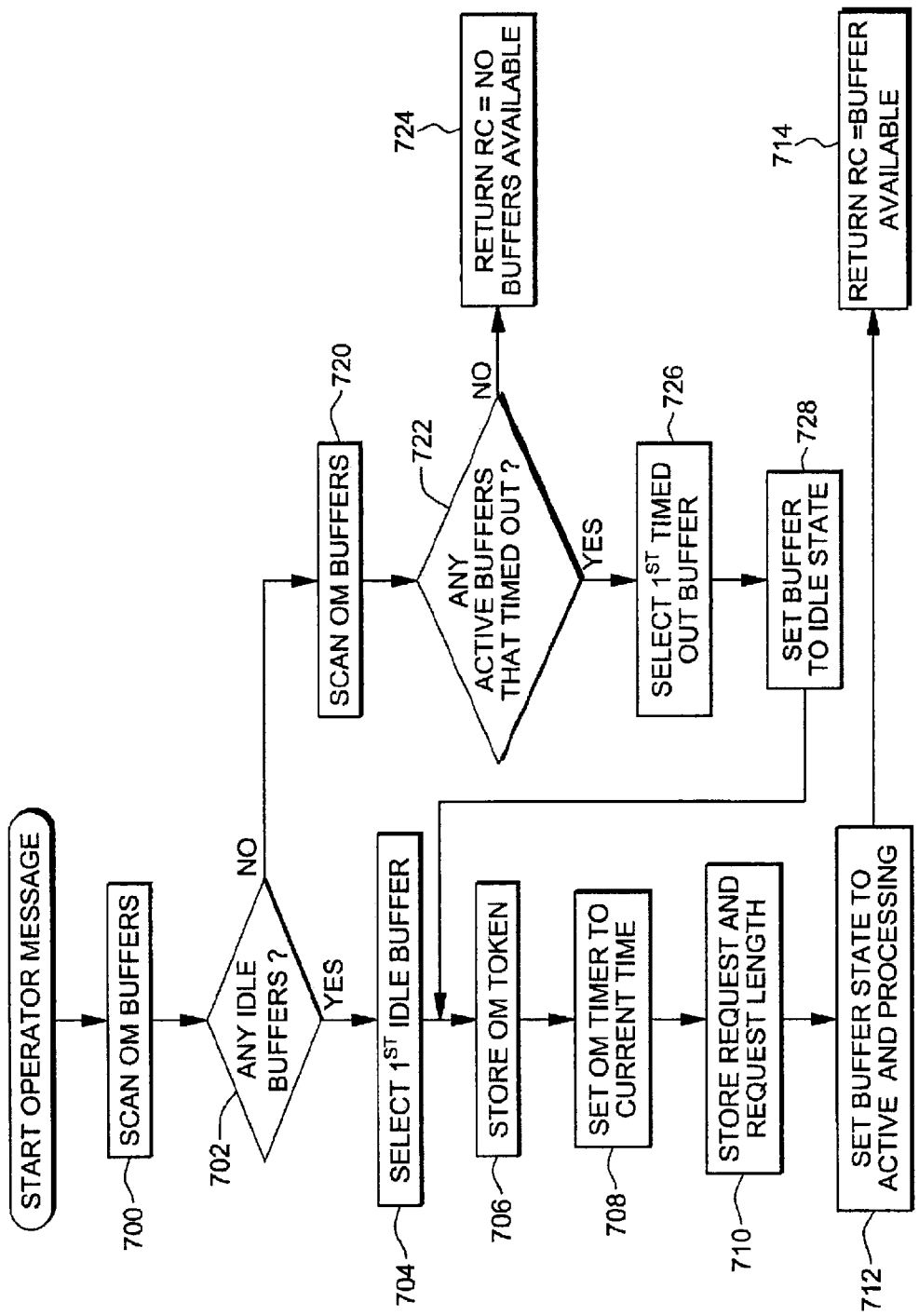
FIG. 7B depicts one embodiment of the logic of a Start Operator Message command used in accordance with an aspect of the present invention.

As indicated above, there are various message commands that are used in accordance with one or more aspects of the present invention. One such command is the Start Operator Message command, an embodiment of which is described with reference to FIG. 7A-7B.

In one example, an operator message command is initiated through, for instance, the z/OS® console or a test program. It flows into the z/OS® logical partition and is sent across to the coupling facility through Send Message in a Start Operator Message command. One embodiment of this processing is described with reference to FIG. 7A.

As described above, the Send Message instruction 250 includes a message operations block 252 and a designation of a subchannel 254. In this case, however, for a Start Operator Message command, the message operations block only includes a message command block address 258, which points to MCB 264/MRB 266. For this operation, there are no message blocks. The message command block presented to the coupling facility includes a Start Operator Message MCB 780 having, for instance, Start Operator Message request parameters 782 and an operator message request 784 that specifies the requested operator command. The response that comes back is a Start Operator Message MRB 790 including Start Operator Message response parameters 792, which include a response code.

In one example, Start Operator Message request parameters include a token, the request, and a request length. The coupling facility and, in particular, the operator message processor via the multiplexor, receives the SMSG command block and begins processing the Start Operator Message command, as described with reference to FIG. 7B.

Initially, the operator message processor scans the operating message buffers looking for an idle buffer (e.g., OMTK has zeros), STEP 700. A determination is made as to whether there are any idle buffers, INQUIRY 702. If there is an idle buffer, then an idle buffer (e.g., the first) is selected, STEP 704. Thereafter, the operator message token is stored in the buffer, STEP 706. Further, an operator message timer in the buffer is set to the current time, STEP 708. In one example, the time is obtained from a time-of-day clock. Further, the request and request length are stored in the buffer, STEP 710, and the buffer state is set to active and in process (a.k.a., active and processing), STEP 712. A return code is returned to the operating system (e.g., z/OS®) indicating the buffer is set, STEP 714, and eventually to the initiator. This processing is performed synchronously to the z/OS® program.

Returning to INQUIRY 702, if there are no idle buffers, then the operator message buffers are scanned once again looking for active buffers that have timed out, STEP 720. A determination is made as to whether there are any active buffers that have timed out, INQUIRY 722. If not, then a return code is provided indicating that there are no buffers available, STEP 724.

However, if there are any active buffers that have timed out, then a timed out buffer is selected, STEP 726. In one example, it is the first timed out buffer that is selected. The buffer is set to the idle state, STEP 728, and processing continues with STEP 706, in which the buffer is initialized.

Further details regarding the Start Operator Message command are described below. As indicated herein, this command, as well as the Read Operator Message command and the Delete Operator message command, are communicated to the coupling facility using SMSG. SMSG sends a message from the logical partition to the coupling facility that includes the requested command. To send the message, the message is included in a message command block (MCB) and any response to the message is included in a message response block (MRB).

In one example, the message command block for the Start Operator Message includes: a message header; the command (e.g., Start Operator Message); the OM request length; the operator message token; and the operator message request (e.g., the operator message command).

In operation, the value of the OM token provided in the request is compared to the OM token object in each OM processing buffer. If the OM token is valid and does not match any OM token object, and if at least one OM processing buffer is idle, an idle buffer is selected. If no OM processing buffers are in the idle state and at least one OM processing buffer is active with response pending and has exceeded the timeout value, a timed out buffer is selected and reset to the idle state.

Once an idle buffer is selected, the OM token is placed in the OMTK object, the OM request is placed in the OMREQD object, the OM request length is placed in the OMREQL object, the OM timer object is set to the value of the time-of-day clock, the buffer is placed in the active and processing state, and a background process is initiated to generate the OM response (i.e., begin processing the requested operator message command and place information (e.g., results regarding the OM command) in the buffer). A return code is returned to the operating system indicating an operator message has started.

If the OM token matches an OM token object for an active OM processing buffer, no processing occurs. The command is completed and a response code is returned indicating an operator message has started.

If the OM token is valid, does not match any OM token object, and all buffers are either active and processing or active with response pending without exceeding the timeout control, the command is completed and a response code is returned indicating no available buffers.

The response is returned in a message response block, which includes, for instance, a response descriptor and the response code.

Figure 8A:
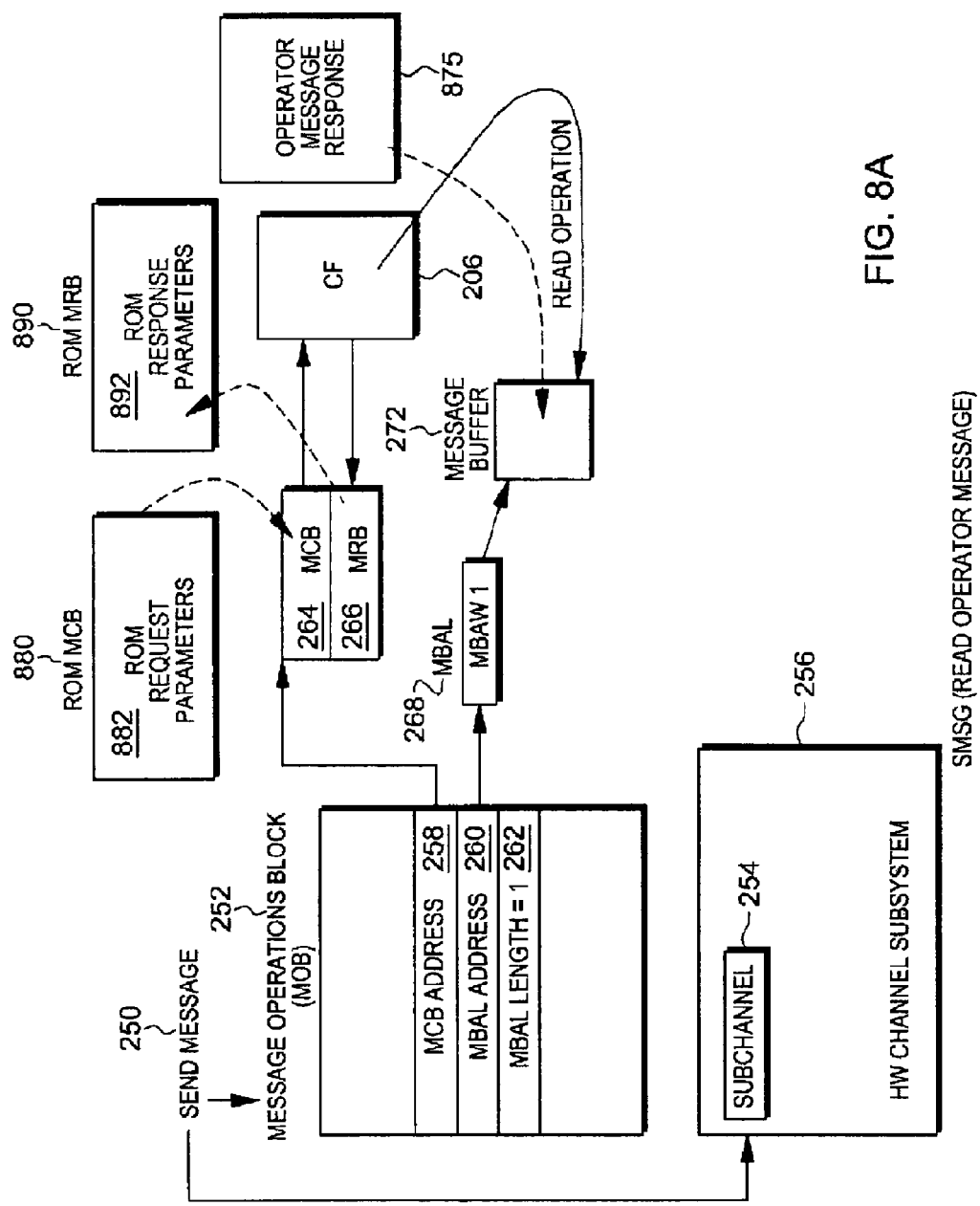
FIG. 8A depicts one embodiment of details relating to using a Send Message instruction to issue a Read Operator Message command, in accordance with an aspect of the present invention.

Responsive to receiving a response indicating that the operator message has been started, a Read Operator Message command is issued to obtain the response to the requested operator message command. Referring to FIG. 8A, the Read Operator Message command is sent via the Send Message protocol. As described above, Send Message instruction 250 includes a message operations block 252 and a designation of a subchannel 254. For a Read Operator Message command, message operations block 252 includes MCB address 258, MBAL address 260, and MBAL length 262. For the Read Operator Message command, the MBAL length is equal to one and MBAL address 260 points to MBAL 268 having one entry. MBAL 268 points to a message buffer 272.

MCB address 258 designates an MCB 264/MRB 266 pair. The message control block 880 for the Read Operator Message command includes the Read Operator Message request parameters 882 (e.g., message header, read command, OM token), which are forwarded to the coupling facility for processing. Responsive to processing the Read Operator Message command, Read Operator Message response parameters (e.g., a response code) are returned in MRB 266. Additionally, an operator message (OM) response 875 is returned and placed in message buffer 272.

Figure 8B:
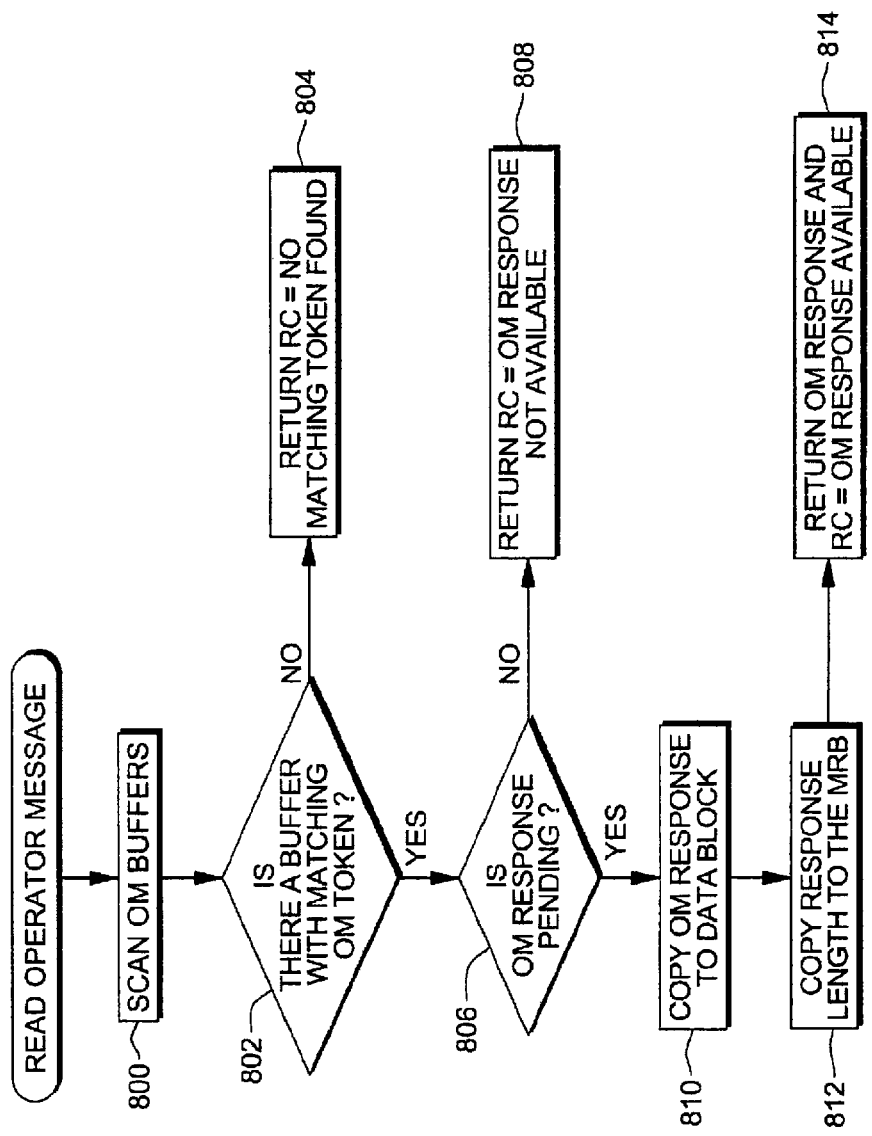
FIG. 8B depicts one embodiment of the logic of a Read Operator Message command used in accordance with an aspect of the present invention.

One embodiment of the logic of the Read Operator Message Command is described with reference to FIG. 8B. Initially, the operator message buffers are scanned for a buffer with an OM token that matches the OM token provided in the command, STEP 800. If there is no buffer with a matching OM token, INQUIRY 802, then a response code is returned indicating no matching token found, STEP 804.

However, if there is an OM buffer with a matching OM token, then a determination is made as to whether there is an OM response pending in the buffer, INQUIRY 806. If there is not an OM response pending, then a response code is returned indicating OM response not available, STEP 808.

Returning to INQUIRY 806, if there is an OM response pending, then the OM response is copied to a data block (e.g., located within message buffer 272) specified by SMSG, STEP 810, and the response length is copied to the message response block, STEP 812. The OM response (i.e., the data block) is returned, as well as a response code indicating an OM response is available, STEP 814.

Further details regarding the Read Operator Message command are described below. In one example, the message command block for the Read Operator Message command includes a message header; the read command; and the operator message token.

In operation, when sufficient message buffer space (e.g., buffer 272) is provided (i.e., buffer space equal to or greater than a pre-specified size is available), the value of the OM token is compared to the OM token object in each OM processing buffer.

If the OM token matches an OM token object for an OM processing buffer and the buffer is active with response pending, the OM response is placed in a data block. The data block, the OM request, the OM request length, the OM response length, and a response code indicating an OM response is available are returned. The response, except the data block, is returned in a message response block, which includes, for instance, a response descriptor, the response code, the OM request length, the OM response length, and the OM request. The data block is returned via SMSG but separate from the response block.

If the OM token matches an OM token object for an OM processing buffer that is active and processing, no processing occurs. The command is completed and a response code is returned to the program indicating an OM response is not available. The response is returned in a response block, which includes, for instance, a response indicator and the response code.

If the OM token is valid but does not match any OM token object for an active OM processing buffer, no processing occurs. The command is completed and a response code is returned indicating no matching token found. The response is returned in a response block, which includes, for instance, a response indicator and the response code.

When the message buffer size is less than a pre-specified size, there is insufficient message buffer space (e.g., buffer 272) to contain the data block. (In this case, no processing occurs, the command is competed and a response code is returned indicating insufficient message buffer space. The response is returned in a response block, which includes, for instance, a response indicator and the response code.

Figure 9A:
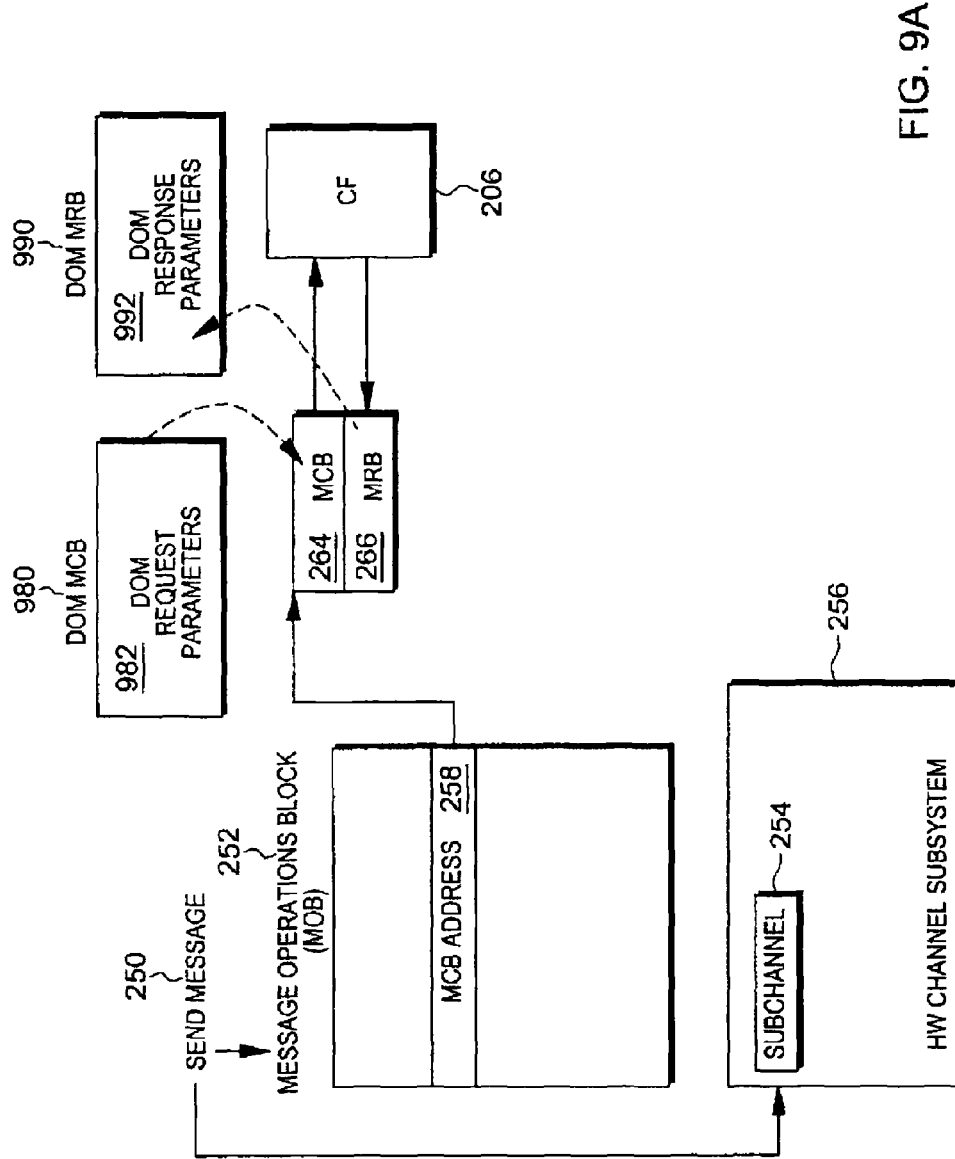
FIG. 9A depicts one embodiment of details relating to using a Send Message command to issue a Delete Operator Message command, in accordance with an aspect of the present invention.

Subsequent to receiving the response, a decision may be made to reset the buffer. Thus, a Delete Operator Message command is issued. Referring to FIG. 9A, as with the other operator message commands, the Delete Operator Message command is sent to the coupling facility via the Send Message protocol. Again, Send Message instruction 250 includes a message operation block 252 and a designation of subchannel 254. In this case, the message operation block includes MCB address 258 pointing to MCB 264/MRB 266 pair. The MCB 980 for the Delete Operator Message includes delete operator message request parameters 982 (e.g., message header, delete command, and OM token), which are forwarded to the coupling facility. Responsive to performing the Delete Operator Message command, a Delete Operator Message MRB 990, including Delete Operator Message response parameters, are returned in MRB 266.

Figure 9B:
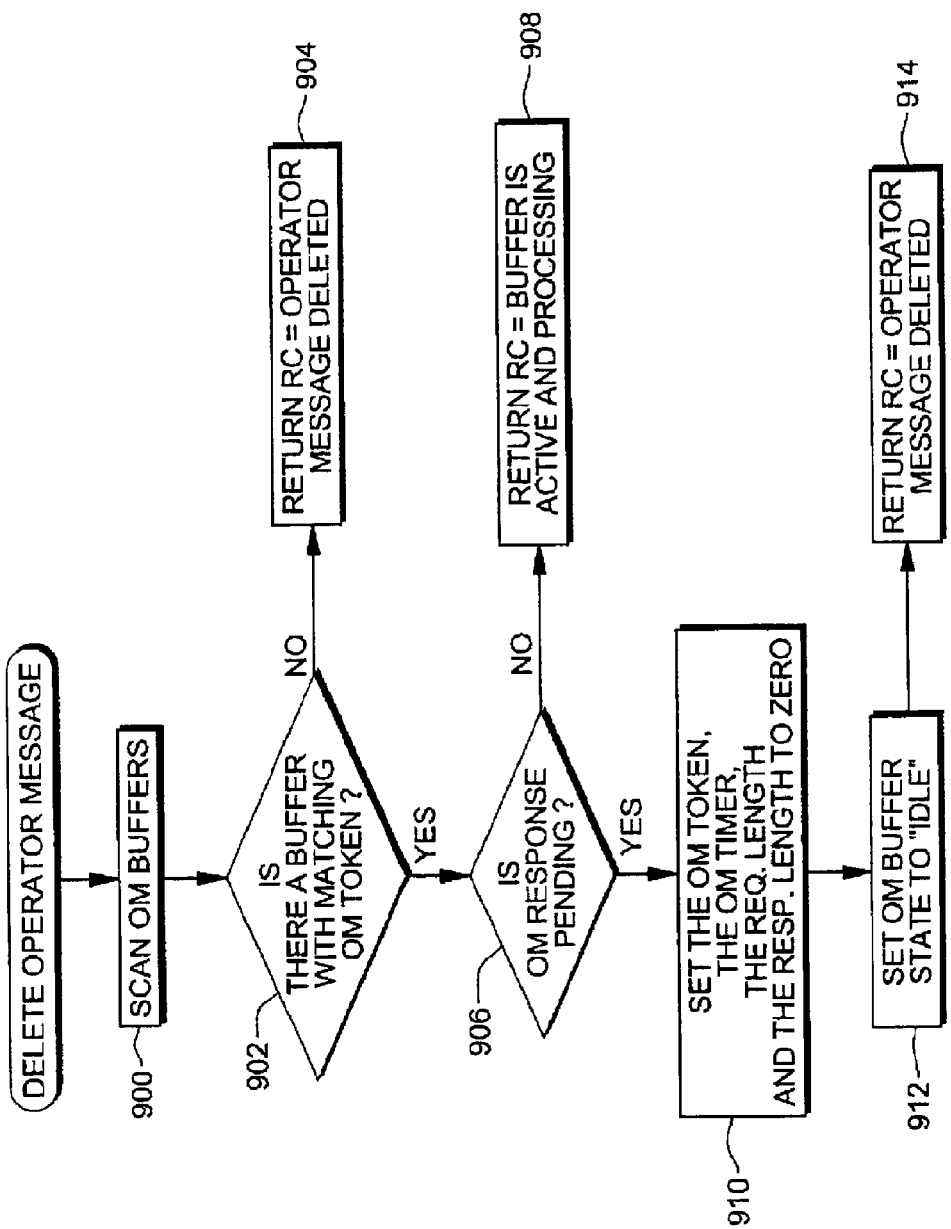
FIG. 9B depicts one embodiment of the logic of a Delete Operator Message instruction used in accordance with an aspect of the present invention.

One embodiment of the logic of the Delete Operator Message Command performed by the operator message processor is described with reference to FIG. 9B. Initially, the OM buffers are scanned for a buffer with a matching OM token, STEP 900. If there is not a buffer with a matching OM token, INQUIRY 902, a response code is returned indicating operator message deleted, STEP 904.

However, if there is a buffer with a matching OM token, INQUIRY 902, then a further determination is made as to whether an OM response is pending, INQUIRY 906. If an OM response is not pending, a response code is returned indicating the buffer is active and processing, STEP 908.

If there is an OM response pending, INQUIRY 906, the OM token, the OM timer, the request length and the response length are reset, e.g., set to zero, STEP 910. Further, the OM buffer state is set to idle, STEP 912, and a response code is returned indicating operator message deleted, STEP 914. (In a further embodiment, setting a buffer to an idle state deletes the buffer; and setting an idle buffer to an active state, creates a new buffer.)

Further details regarding the Delete Operator Message command are described below. In one example, the message command block for the Delete Operator Message command includes a message header; the Delete Operator Message command; and the operator message token.

In operation, the value of the OM token is compared to the OM token object in each OM processing buffer. If the OM token matches the value of an OM token object in an active OM processing buffer and the buffer is active with response pending, the objects in the OM processing buffer are reset and the buffer is placed in the idle state. When the buffer objects have been reset, the command is completed and a response code is returned to the operating system indicating the operator message is deleted.

When the OM processing buffer is active and processing, no action occurs. The command is completed and a response code is returned indicating the buffer is active and processing.

When the OM token is valid but does not match the OM token object for any active OM processing buffer, no action occurs. The command is completed and a response code is returned to the program indicating the operator message is deleted.

The response is returned in a message response block, which includes, for instance, a response descriptor and the response code.

Described in detail above are various commands to process operator message requests. These commands are part of an Operator Message facility, in this example. The Operator Message facility includes other commands, which are described herein for completeness. These commands include a Read Facility Parameters command and Set Facility Authority command.

For the Read Facility Parameters command, the message request block includes, for instance, a message header and the Read Facility Parameters command. In operation, the values of coupling facility controls are placed in the response operands, and a response code indicating success, if true, is stored in the response code operand. This command may place a number of controls in the response operands, however, for the Operator Message Facility, the operator message processor buffer count is placed in the OMPBC, and the operator message timeout control is placed in the OMTOC.

When the response code indicates that the coupling facility control values are returned, the message response block that is returned includes, for instance, a response descriptor, the response code, OM processor buffer count, and OM timeout control for the Operator Message Facility. Other controls may also be returned for other facilities.

For the Set Facility Authority command, the message request block includes, for instance, a message header, the Set Facility Authority command, an OM timeout control, an update OMTOC indicator, a comparative authority control and an authority control, described below.

In operation, a coupling facility authority control value is compared to a comparative authority (CAU) operand received in the message command block. When they compare as equal, the value of an authority (AU) operand received in the message command block is stored in the coupling facility authority control and the coupling facility state is updated.

When the coupling facility authority control is changed from zero to a nonzero value, the coupling facility state is changed from non-managed to managed, the OM timeout control is conditionally updated, an activate-message-path command is issued on each message path to a remote coupling facility, and a response code indicating success is returned. If the update-Om-timeout indicator is one, the OM timeout control operand is stored in the OMTOC object. Otherwise, no update is made to the OMTOC object. Other processing may also occur.

The response code is returned in a message response block that includes, for instance, a response descriptor and the response code.

In accordance with one or more aspects of the present invention, an Operator Message Facility is provided for processing, by a coupling facility, operator message commands from multiple sources, including, but not limited to, coupling facility consoles and logical partitions (or other processors, systems, etc.) coupled to the coupling facility. The facility includes, for instance:

A collection of operator message (OM) processing buffers. Each buffer can process one operator message request at a time. The number of buffers is fixed (e.g., 9) and is model dependent.

A count of the number of supported OM processing buffers.

An expiration timeout, called the OM timeout control, that determines the length of time an operator message will persist in a processing buffer before it is deleted. The default value for the expiration timeout is, for instance, 5 minutes. It may be changed by the Set Facility Authority command.

Global commands that allow a program to access the Operator Message Facility:
Start Operator Message (SOM)
Read Operator Message (ROM)
Delete Operator Message (DOM)

A background processing function that generates the operator message response, places the response in the OM processing buffer, and changes the state of the buffer to indicate the response is available for retrieval.

This facility provides, in one aspect, a mechanism for remote entities, other than coupling facility consoles, to issue operator message commands to, e.g., test the coupling facility. This allows more in-depth testing, e.g., prior to production or even in production. The operator message commands result in an action being performed on the coupling facility. Examples of such commands/actions include, but are not limited to, installing a patch of code on the coupling facility, creating a dump of a portion of the coupling facility, configuring the coupling facility, deconfiguring the coupling facility or managing one or more components of the coupling facility. Other actions are also possible, some of which are described herein. An action is performed on the coupling facility, pursuant to the requested command, and then, a determination is made as to whether the action performed as expected, caused an error, etc. By performing the action, the coupling facility is tested to see if the coupling behaved as expected pursuant to the action.

In one particular example, a program on the z/OS system generates a sysplex-wide unique token using the system name and a Store Clock (STCK) value, and issues an SMSG instruction to send the CFCC operator command to the coupling facility. The coupling facility accepts the command and processes the command asynchronously. If that SMSG is successful, the z/OS program polls for command completion with a buffer to contain the command response using the unique token issued on the first SMSG. When the CFCC processes the command, it issues messages to the coupling facility console and saves the messages into a buffer. When the command is complete, the SMSG used to poll for command completion will get a successful return code and return the command response into the specified buffer. The z/OS program then processes the results and issues a SMSG to delete the saved command responses from the coupling facility. The program could be a testcase which processes results or a z/OS command interface that displays result on a console, as examples.

As used herein, obtaining includes, but is not limited to, receiving, having, being provided, generating or creating, as examples.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
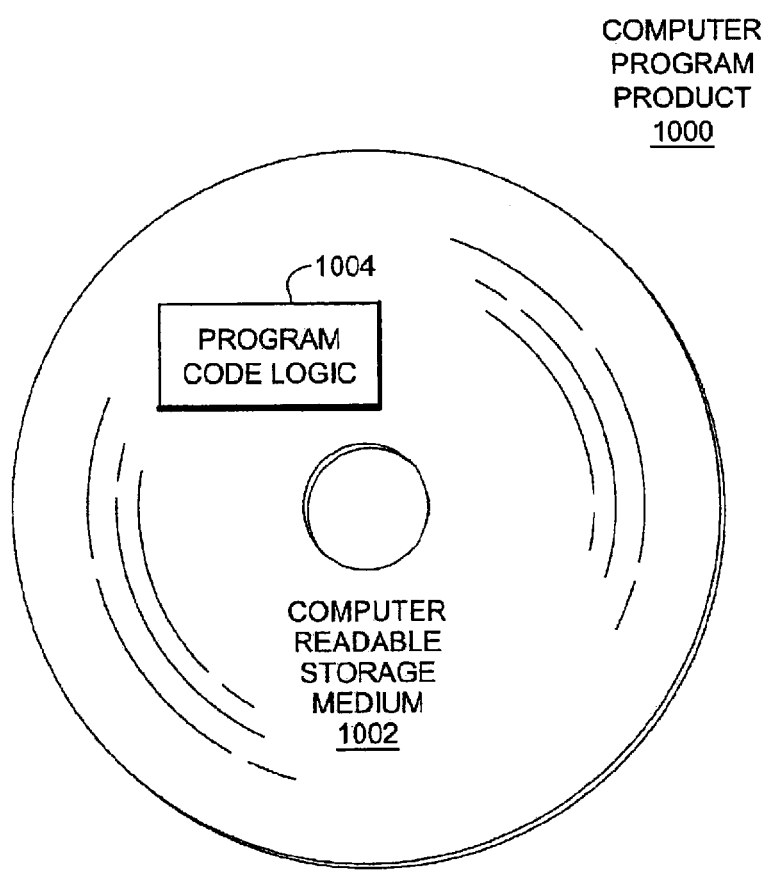
FIG. 10 depicts one embodiment of a computer program product incorporating one or more aspects of the present invention.

Referring now to FIG. 10, in one example, a computer program product 1000 includes, for instance, one or more non-transitory computer readable storage media 1002 to store computer readable program code means or logic 1004 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than z196 servers can include, use and/or benefit from one or more aspects of the present invention. Further, environments other than logical partitioned environments may incorporate and use one or more aspects of the present invention. Additionally, more, less or other operator message commands and/or other commands may be used. Yet further, transports other than SMSG may be used. Moreover, the multiplexor may use other logic to select the next command to be processed. Many other variations are possible.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 11:
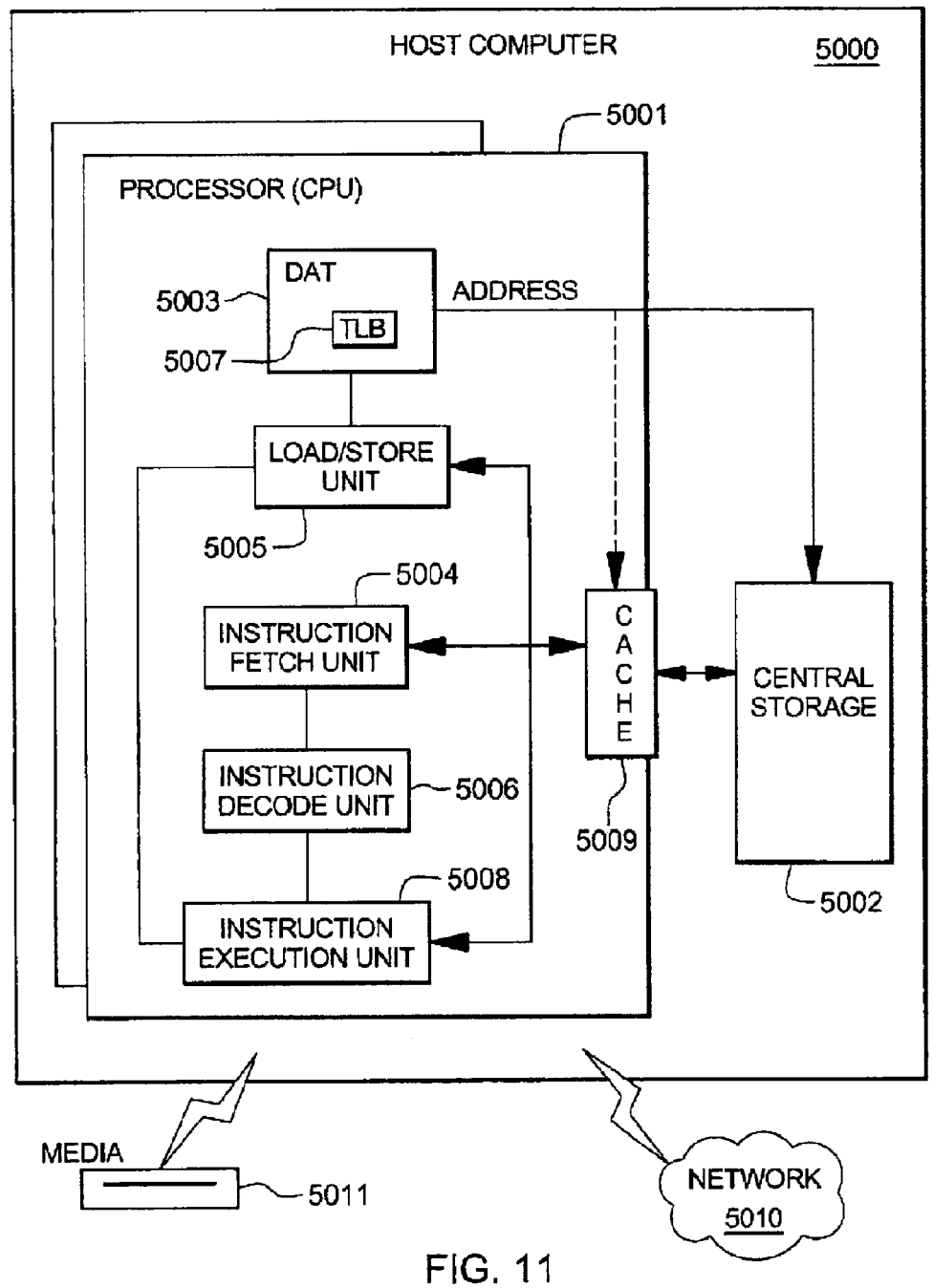
FIG. 11 depicts one embodiment of a host computer system to incorporate and use one or more aspects of the present invention.

Referring to FIG. 11, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 11, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 12:
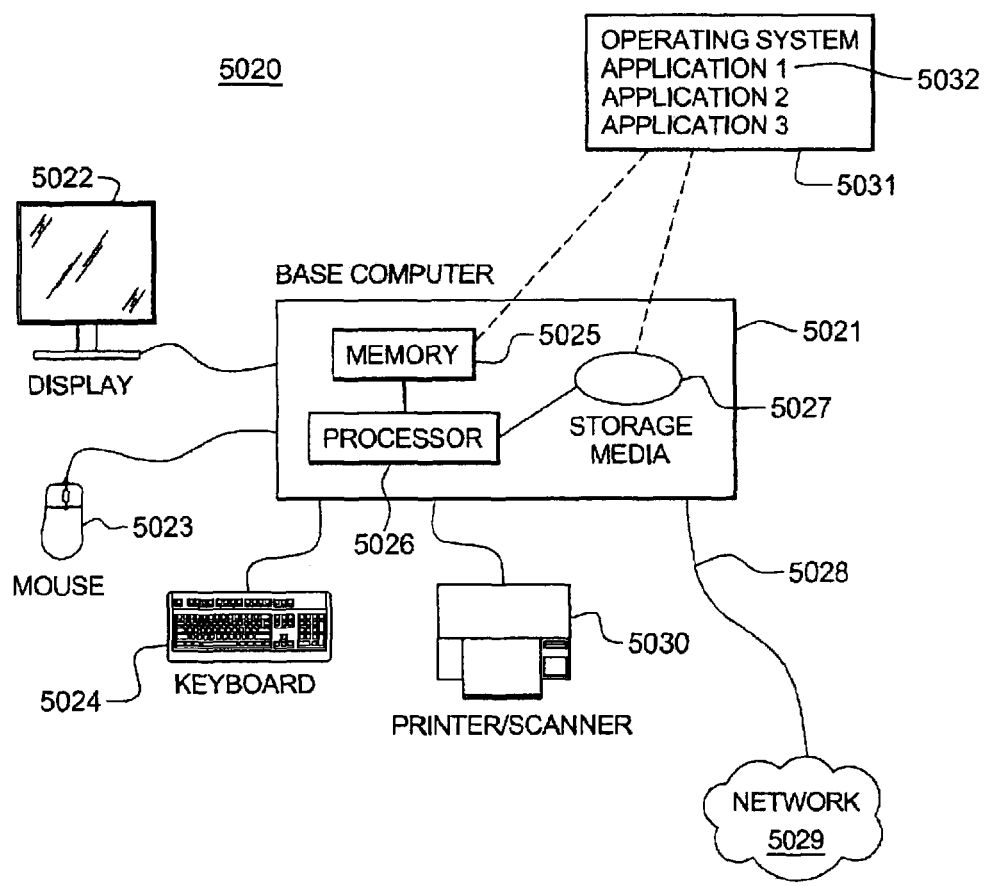
FIG. 12 depicts a further example of a computer system to incorporate and use one or more aspects of the present invention.

FIG. 12 illustrates a representative workstation or server hardware system in which one or more aspects of the present invention may be practiced. The system 5020 of FIG. 12 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 13:
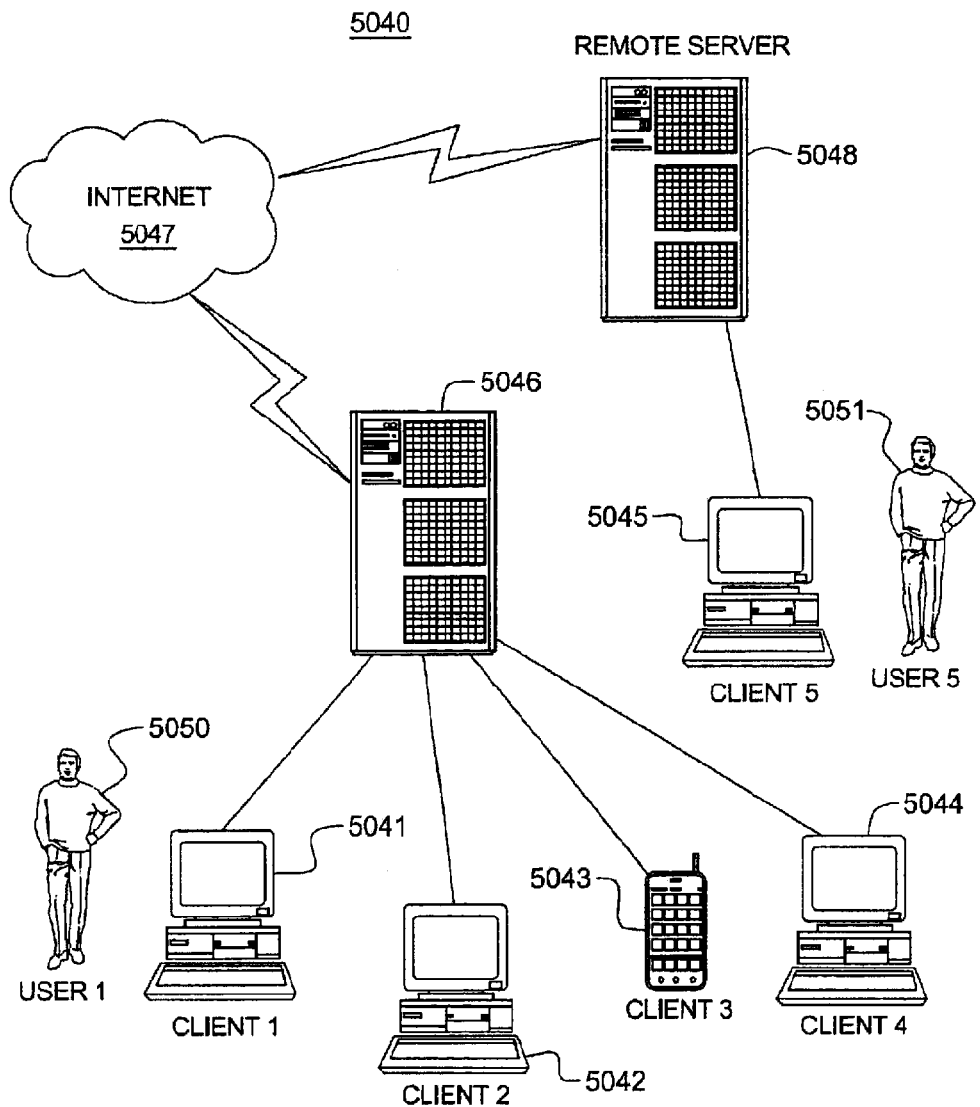
FIG. 13 depicts another example of a computer system comprising a computer network to incorporate and use one or more aspects of the present invention.

FIG. 13 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 13, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 12 and FIG. 13, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 14:
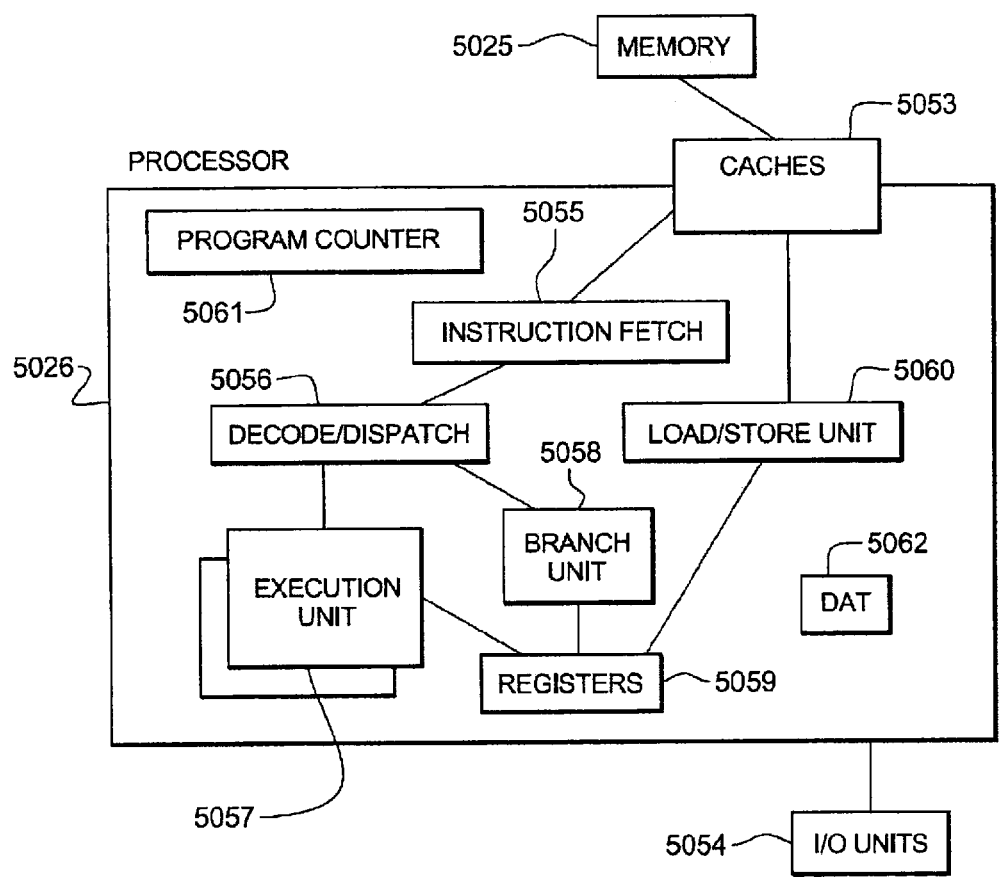
FIG. 14 depicts one embodiment of various elements of a computer system to incorporate and use one or more aspects of the present invention.

Referring to FIG. 14, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 15A:
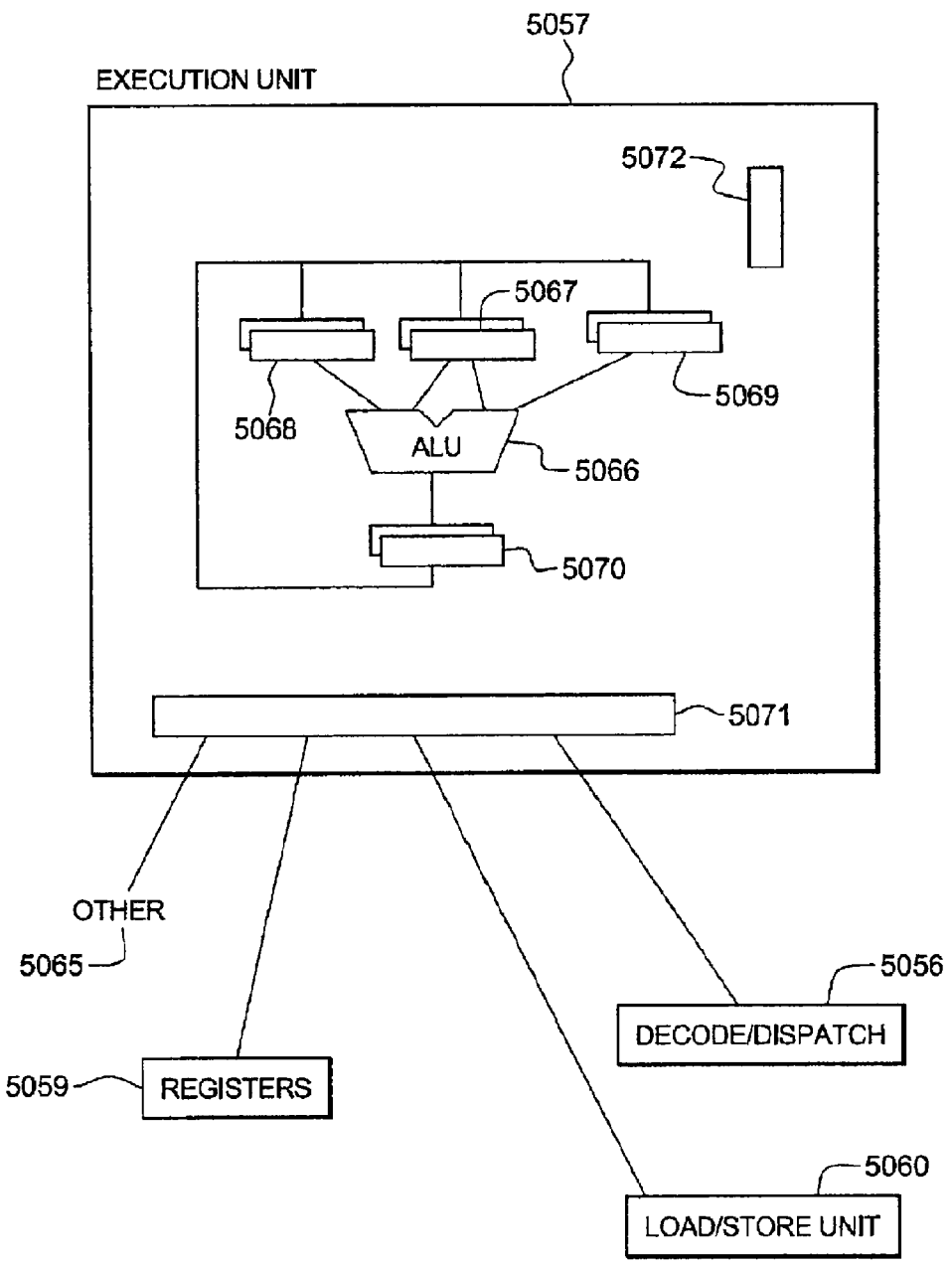
FIG. 15A depicts one embodiment of the execution unit of the computer system of FIG. 14 to incorporate and use one or more aspects of the present invention.

A processor 5026 typically has one or more units 5057, 5058, 5060 for executing the function of the instruction. Referring to FIG. 15A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive- or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 15B:
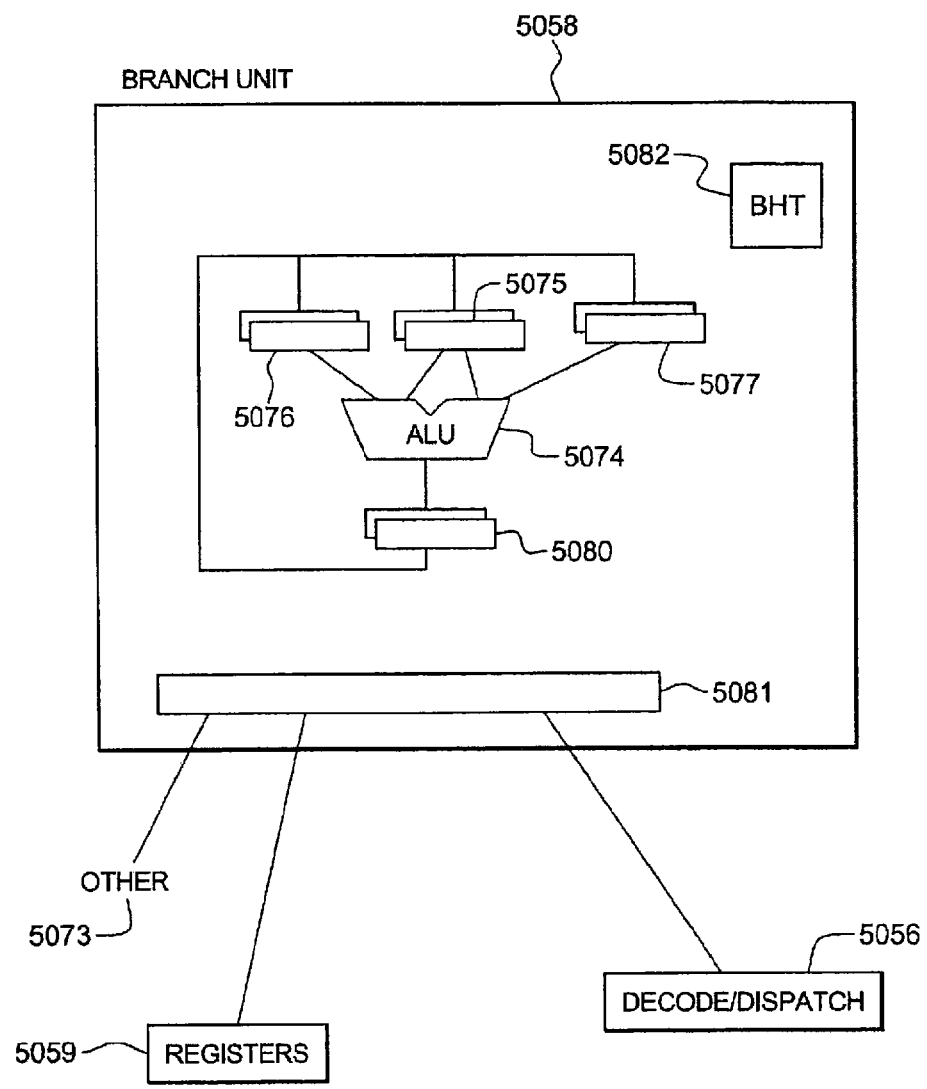
FIG. 15B depicts one embodiment of the branch unit of the computer system of FIG. 14 to incorporate and use one or more aspects of the present invention.

Referring to FIG. 15B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 15C:
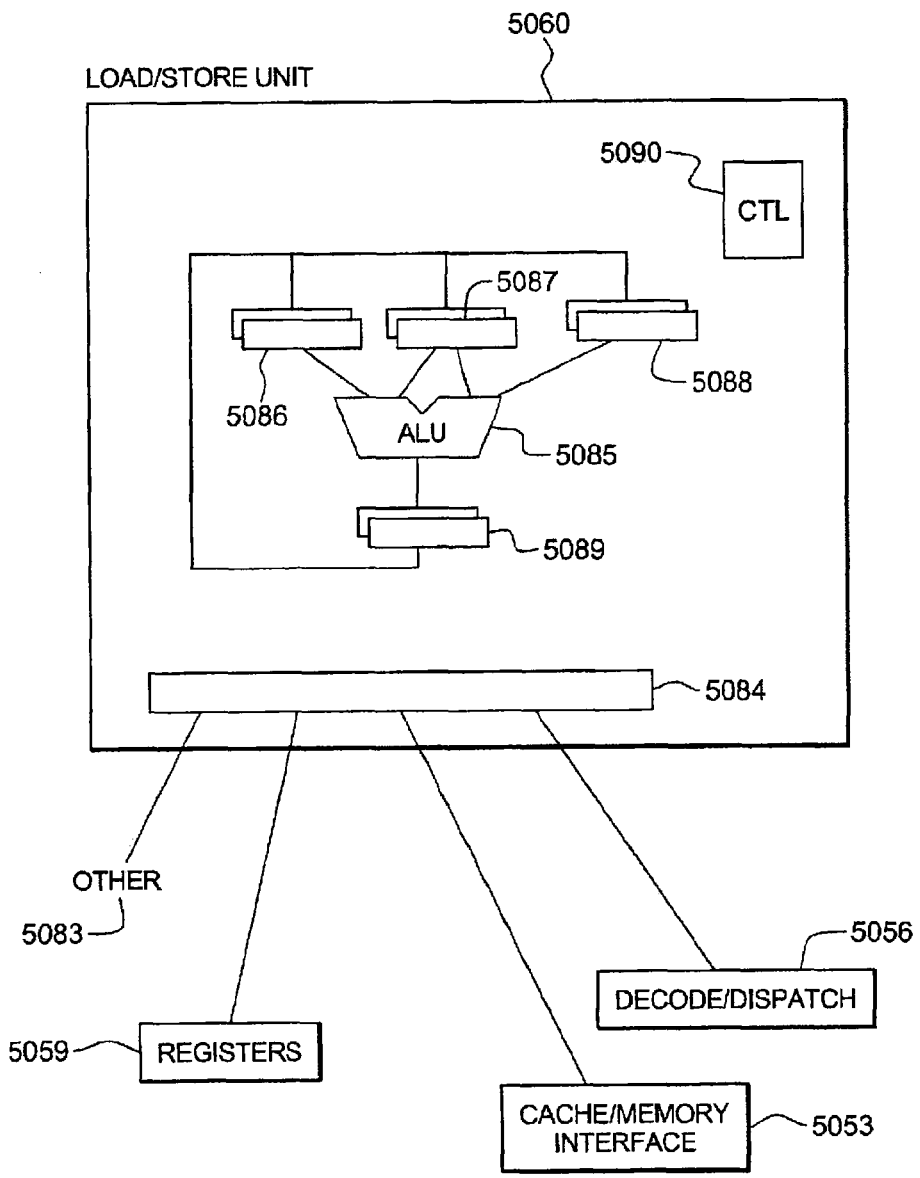
FIG. 15C depicts one embodiment of the load/store unit of the computer system of FIG. 14 to incorporate and use one or more aspects of the present invention.

Referring to FIG. 15C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 14) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to, U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 16:
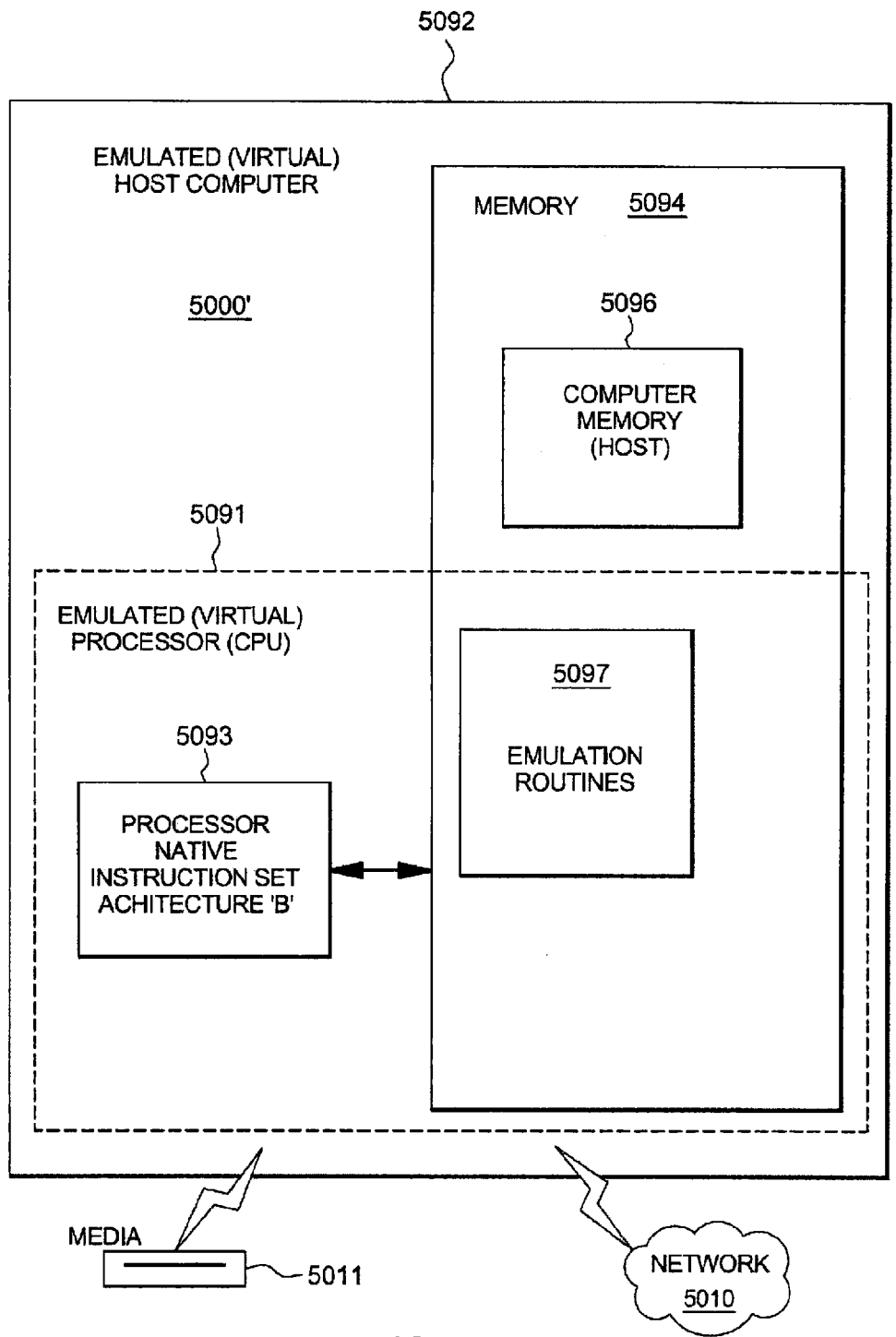
FIG. 16 depicts one embodiment of an emulated host computer system to incorporate and use one or more aspects of the present invention.

In FIG. 16, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of processing a start command in a computing environment comprising a coupling facility coupled to one or more processor images of the computing environment, the method comprising:

receiving by the coupling facility from a processor image coupled thereto a start operator message command, the start operator message command comprising a message command block including a message header, an indication of the start operator message command, an operator message request that includes an operator message command to be processed by the coupling facility, an operator message request length and an operator message token;

based on receiving the start operator message command, processing the start operator message command, wherein the processing comprises:

storing within a selected buffer of one or more buffers the operator message token, the operator message request and the operator message request length, wherein the operator message token uniquely identifies the operator message command and associates the selected buffer with the operator message command;

setting within the selected buffer a timer to current time;

setting a state of the selected buffer; and providing a response code for the start operator message command.

2. The method of claim 1, wherein the response code indicates that an operator message has been started.

3. The method of claim 1, wherein the state of the selected buffer is set to active and in process.

4. The method of claim 1, further comprising:

determining whether an idle buffer exists, wherein an idle buffer is indicated by a token field of the buffer being zero;

selecting an idle buffer as the selected buffer, based on the determining indicating an idle buffer exists;

checking whether an active buffer has timed out, based on the determining indicating there are no idle buffers; and selecting an active buffer that has timed out as the selected buffer, based on the checking indicating there is an active buffer that has timed out.

5. The method of claim 1, wherein based on receiving the start operator message command, performing an action specified by the operator message request and storing an operator message response in the buffer.

6. The method of claim 5, further comprising obtaining, by the coupling facility, a read operator message command to read the buffer to obtain the operator message response.

7. The method of claim 6, wherein the read operator message command comprises a message command block comprising a message header, the operator message token and a command specifying the read operator message command.

8. The method of claim 7, further comprising processing the read operator message command, wherein the processing comprises:

determining whether a buffer within the coupling facility has a token matching the operator message token;

based on determining a buffer has a token matching the operator message token, checking whether an operator message response is pending within the buffer having the token matching the operator message token; and based on the determining indicating the operator message response is pending, copying the operator message response from the buffer having the token matching the operator message token to a data block, copying a response length to a message response block of the read operator message command, and providing to the processor image the message response block and at least an indication of the data block.

9. The method of claim 1, further comprising:

receiving, by the coupling facility, a delete operator message command; and processing the delete operator message command to place the selected buffer in an idle state.

10. The method of claim 9, wherein the delete operator message command comprises a message command block comprising a message header, a command specifying the delete operator message command, and the operator message token, and wherein the processing comprises:

determining whether a buffer within the coupling facility has a token matching the operator message token;

based on determining a buffer has a token matching the operator message token, checking whether an operator message response is pending within the buffer having the token matching the operator message token;

based on the determining indicating the operator message response is pending, resetting one or more fields of the selected buffer having the token matching the operator message token and setting the state of the selected buffer to idle; and providing a message response block indicating that the operator message is deleted.

11. The method of claim 10, wherein the resetting includes setting the operator message token to zero.

12. The method of claim 1, further comprising:

determining whether an idle buffer exists;

selecting an idle buffer as the selected buffer, based on the determining indicating an idle buffer exists;

checking whether an active buffer has timed out, based on the determining indicating there are no idle buffers; and selecting an active buffer that has timed out as the selected buffer, based on the checking indicating there is an active buffer that has timed out.

13. The method of claim 1, wherein the operator message command is to take action on the coupling facility, and wherein the method further comprises receiving operator message commands by the coupling facility to test the coupling facility, the operator message commands received from a plurality of types of sources remote from the coupling facility, including a coupling facility console and the processor image.

14. The method of claim 1, wherein the selected buffer is located within the coupling facility.

15. The method of claim 1, wherein the setting the state comprises setting within the selected buffer the state.

* * * * *